US010673634B2

United States Patent
Wilkins et al.

(10) Patent No.: US 10,673,634 B2
(45) Date of Patent: *Jun. 2, 2020

(54) CRYPTO INTEGRATION PLATFORM

(71) Applicant: tZERO Group, Inc., New York, NY (US)

(72) Inventors: Alec Wilkins, Salt Lake City, UT (US); Eric Nathaniel Fish, Salt Lake City, UT (US); Trent Norman Larson, Salt Lake City, UT (US); Patrick M. Byrne, Salt Lake City, UT (US)

(73) Assignee: tZERO Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,534

(22) Filed: Dec. 28, 2018

(65) Prior Publication Data

US 2019/0140842 A1    May 9, 2019

Related U.S. Application Data

(63) Continuation of application No. 15/017,359, filed on Feb. 5, 2016, now Pat. No. 10,171,245.

(Continued)

(51) Int. Cl.
*H04L 29/06* (2006.01)
*H04L 9/32* (2006.01)
(Continued)

(52) U.S. Cl.
CPC ............ *H04L 9/3247* (2013.01); *G06F 21/64* (2013.01); *G06Q 40/04* (2013.01); *H04L 63/126* (2013.01);
(Continued)

(58) Field of Classification Search
CPC .... G06Q 40/04; G06Q 30/08; H04L 2209/56; H04L 9/3247
See application file for complete search history.

(56) References Cited

U.S. PATENT DOCUMENTS 6,598,028 B1   7/2003 Sullivan et al.
6,629,082 B1   9/2003 Hambrecht et al.
(Continued)

FOREIGN PATENT DOCUMENTS

GB    2514716 A    12/2014
JP    2002245251 A    8/2002
(Continued)

OTHER PUBLICATIONS

European Patent Office; "Extended European Search Report from EP Application No. 16789835.2, dated Nov. 9, 2018"; from Foreign Counterpart of U.S. Appl. No. 15/141,582; pp. 1-7; Dated: Nov. 9, 2018; Published: EP.

(Continued)

*Primary Examiner* — Alexander Lagor
*Assistant Examiner* — Vu V Tran
(74) *Attorney, Agent, or Firm* — Fogg & Powers LLC

(57) ABSTRACT

Methods and systems described herein create a first addressed account and a second addressed account that each have a common identifier and are each associated with a customer. The system can receive an order for exchanging digital transactional items associated with the first addressed account, where the order is associated with the common identifier. A private key associated with the first addressed account can be used to electronically sign a first transaction to transfer the digital transactional items from the first addressed account to the second addressed account, and the same private key can be used to sign a second transaction. After verifying that the first transaction was signed with the (Continued)

same private key as the first transaction, the system authorizes placement of the order on a cryptographic exchange.

20 Claims, 14 Drawing Sheets

Related U.S. Application Data

(60) Provisional application No. 62/113,931, filed on Feb. 9, 2015.

(51) Int. Cl.
  *G06Q 40/04*   (2012.01)
  *G06F 21/64*   (2013.01)

(52) U.S. Cl.
  CPC .... *H04L 2209/56* (2013.01); *H04L 2463/102* (2013.01)

(56) References Cited

U.S. PATENT DOCUMENTS

| | | | |
|---|---|---|---|
| 6,668,325 | B1 | 12/2003 | Collberg et al. |
| 7,069,234 | B1 | 6/2006 | Cornelius et al. |
| 7,130,807 | B1 | 10/2006 | Mikurak |
| 7,587,358 | B2 | 9/2009 | Hambrecht et al. |
| 7,716,467 | B1 | 5/2010 | Deffet et al. |
| 8,024,258 | B2 | 9/2011 | Gastineau et al. |
| 8,117,112 | B2 | 2/2012 | Hambrecht et al. |
| 8,204,821 | B2 | 6/2012 | Staib et al. |
| 8,355,973 | B2 | 1/2013 | Geller et al. |
| 8,712,920 | B2 | 4/2014 | Walker et al. |
| 8,732,023 | B2 | 5/2014 | Mikurak |
| 9,020,850 | B1 | 4/2015 | Anderson |
| 9,177,313 | B1 | 11/2015 | Silverman |
| 9,397,985 | B1 | 7/2016 | Seger, II et al. |
| 9,704,143 | B2 | 7/2017 | Walker et al. |
| 2002/0128958 | A1 | 9/2002 | Slone |
| 2004/0064351 | A1 | 4/2004 | Mikurak |
| 2006/0064372 | A1* | 3/2006 | Gupta .................... G06Q 20/10 705/39 |
| 2007/0106892 | A1 | 5/2007 | Engberg |
| 2008/0313068 | A1 | 12/2008 | Sun |
| 2009/0119197 | A1 | 5/2009 | Littlewood |
| 2009/0177591 | A1 | 7/2009 | Thorpe et al. |
| 2011/0071935 | A1 | 3/2011 | Balabon |
| 2011/0164192 | A1 | 7/2011 | Ozawa |
| 2011/0295736 | A1 | 12/2011 | Freer et al. |
| 2013/0006840 | A1 | 1/2013 | Cahn |
| 2013/0086393 | A1 | 4/2013 | Pogmore |
| 2013/0218741 | A1 | 8/2013 | Fenichel et al. |
| 2013/0268772 | A1 | 10/2013 | Golle |
| 2014/0052598 | A1* | 2/2014 | Briem .................... G06Q 40/04 705/37 |
| 2014/0201057 | A1 | 7/2014 | Shuster |
| 2015/0026072 | A1 | 1/2015 | Zhou et al. |
| 2015/0046337 | A1* | 2/2015 | Hu ..................... G06Q 20/0658 705/65 |
| 2015/0220928 | A1* | 8/2015 | Allen ................. G06Q 20/0655 705/67 |
| 2015/0262168 | A1* | 9/2015 | Armstrong ............. G06Q 20/16 705/39 |
| 2015/0332395 | A1* | 11/2015 | Walker ................... G06Q 20/06 705/69 |
| 2016/0092988 | A1 | 3/2016 | Letourneau |
| 2016/0217436 | A1 | 7/2016 | Brama |
| 2016/0224949 | A1 | 8/2016 | Thomas et al. |
| 2016/0234026 | A1 | 8/2016 | Wilkins et al. |
| 2016/0260169 | A1* | 9/2016 | Arnold .................... G06Q 40/12 |
| 2016/0261685 | A1 | 9/2016 | Chen et al. |
| 2016/0261690 | A1 | 9/2016 | Ford |
| 2016/0267474 | A1 | 9/2016 | Lingham et al. |
| 2016/0267566 | A1 | 9/2016 | Levitt et al. |
| 2016/0267605 | A1 | 9/2016 | Lingham et al. |
| 2016/0292680 | A1 | 10/2016 | Wilson et al. |
| 2016/0321751 | A1 | 11/2016 | Creighton et al. |
| 2016/0321752 | A1 | 11/2016 | Tabacco et al. |
| 2016/0350749 | A1 | 12/2016 | Wilkins et al. |
| 2017/0109744 | A1 | 4/2017 | Wilkins et al. |

FOREIGN PATENT DOCUMENTS

| | | | |
|---|---|---|---|
| JP | 2003036348 | A | 2/2003 |
| JP | 2005202977 | A | 7/2005 |
| WO | 2001084906 | A2 | 11/2001 |
| WO | 2012123394 | A1 | 9/2012 |
| WO | 2016178999 | A1 | 11/2016 |
| WO | 2017131929 | A1 | 8/2017 |

OTHER PUBLICATIONS

U.S. Patent and Trademark Office, "Office Action for U.S. Appl. No. 15/017,359", dated Dec. 12, 2017, pp. 1-42, Published in: US.

U.S. Patent and Trademark Office; "Notice of Allowance" U.S. Appl. No. 15/017,359; dated Aug. 13, 2018; pp. 1-37; Published: US.

Intellectual Property Office of Singapore, "Examination Report from SG Application No. 11201706289W dated Mar. 5, 2019", from Foreign Counterpart to U.S. Appl. No. 15/017,359, pp. 1-5, Published: SG.

European Patent Office, "Communication pursuant to Article 94(3) from EP Application No. 16766103.2 dated Mar. 15, 2019", from Foreign Counterpart to U.S. Appl. No. 15/017,359, pp. 1-9, Published: EP.

"European Patent Office; EP Extend Search Report from EP Application No. 16835564.2, dated Jan. 8, 2019"; from Foreign Counterpart of U.S. Appl. No. 15/164,341; pp. 1-7; dated Jan. 14, 2019; Published: EP.

U.S. Patent and Trademark Office, "Office Action", U.S. Appl. No. 15/164,341, Feb. 14, 2019, pp. 1-18, Published: US.

Anonymous, "Bitcoin", "https://en.wikipedia.org/w/index.php?title+Bitcoin&oldid+646184058", Feb. 8, 2015, pp. 1-39, XP055319200, Publisher: Wikipedia, The Free Encyclopedia. Retrieved on Nov. 14, 2016.

Anonymous, "Digital Signature", "https://en.wikipedia.org/w/index.php?title=Digital_signature&oldid=646145535", Feb. 8, 2015, pp. 1-11, XP055319249, Publisher: Wikipedia, The Free Encyclopedia. Retrieved on Nov. 14, 2016.

Bhanot et al, "Distributed Ledgers: Possibilities and Challenges in Capital Markets Applications", "Cognizant 20-20 Insights", "https://www.cognizant.com/whitepapers/distributed-ledgers-possibilities-and-challenges-in-capital-markets-applications-codex1974.pdf", Dated Jun. 1, 2016, Retrieved on Feb. 20, 2018, pp. 1-10, Publisher: Cognizant.

BTC Inc, "Overstock Plans to Open Blockchain-Based Stock Exchange to to Other Publicly Traded Companies", "https://distributed.com/news/overstock-plans-to-open-blockchain-based-stock-exchange-t-totother-publicly-traded-companies/", Retrieved on Mar. 27, 2018, pp. 1-6, Publisher: BTC Media.

Del Castillo, "Overstock Raises $10.9 Million in First Blockchain Stock Issuance", "CoinDesk", "https://www.coindesk.com/overstock-first-blockchain-stock-issuance/", Updated Dec. 16, 2016, Retrieved Feb. 20, 2018, pp. 1-5.

Finextra, "Overstock Looks to Issue Bitcoin-Style Stocks", "Finextra", "https://www.finextra.com/newsarticle/27294/overstock-looks-to-issue-bitcoin-style-stocks", Dated Apr. 29, 2015, Retrieved on Feb. 20, 2018, pp. 1-3.

Guagliardo et al, "Blockchain and Public Securities: Shedding Light on 'Going Dark'", "Power of Intelligence, Insight Center: Publications", "http://www.pepperlaw.com/publications/blockchain-and-public-securities-shedding-light-on-going-dark-2016-09-27/", Dated Sep. 27, 2016, Retrieved on Feb. 20, 2018, pp. 1-3. Publisher: Pepper Hamilton LLC.

Intellectual Property Office of Singapore, Invitation to Respond to Written Opinion from SG Application No. 11201706289W, dated Apr. 16, 2018, from Foreign Counterpart of U.S. Appl. No. 15/017,359, Dated Apr. 16, 2018, pp. 1-6, Published in: SG.

(56) References Cited

OTHER PUBLICATIONS

Intellectual Property Office of Singapore; "Invitation to Respond to Written Opinion from SG Application No. 11201708960W dated Jun. 11, 2018"; from Foreign Counterpart of U.S. Appl. No. 15/141,582; pp. 1-7; Dated Jun. 11, 2018; Published: SG.
Intellectual Property Office of Singapore; "Written Opinion from SG Application No. 11201709186S dated Jul. 23, 2018"; from Foreign Counterpart of U.S. Appl. No. 15/164,341; pp. 1-6; Dated Jul. 23, 2018; Published: SG.
International Search Authority, "International Preliminary Report on Patentability from PCT Application No. PCT/US2016/030122 filed Apr. 29, 2016, from Foreign Counterpart to U.S. Appl. No. 15/141,582" dated Nov. 16, 2017, pp. 1-10, Published in: WO.
International Search Authority, "International Search Report for PCT/US16/34130", "Foreign counterpart to U.S. Appl. No. 15/164,341", dated Jan. 27, 2017, pp. 1-8, Published in: WO.
International Searching Authority, "International Preliminary Report on Patentability for PCT Application No. PCT/US2016/034130 filed on May 25, 2016", from Foreign Counterpart of U.S. Appl. No. 15/164,341, dated Dec. 7, 2017, pp. 1-7, Published in: WO.
International Searching Authority, "International Search Report and Written Opinion for PCT App. No. PCT/US16/69544", Foreign Counterpart to U.S. Appl. No. 15/396,030, dated Mar. 24, 2017, pp. 1-12, Published in: WO.
International Searching Authority, "International Search Report for PCT App No. PCT/US2016/030122", Foreign Counterpart to U.S. Appl. No. 15/141,582, dated Jul. 29, 2016, pp. 1-11, Published in: WO.
International Searching Authority, "Notice of International Preliminary Report on Patentability," from PCT Application No. PCT/US2016/016845, dated Aug. 24, 2017, pp. 1-10, Published in WO.
"International Searching Authority, International Search Report for PCT App. No. PCT/US2016/016845", "Foreign Counterpart to U.S. Appl. No. 15/017,359", dated Nov. 23, 2016, pp. 1-14, Published in: WO.
Marcogliese et al, "Bitcoins and Blockchain—The Use of Distributed Ledger Technology for the Issuance of Digital Securities", "Cleary M & A and Corporate Governance Watch, Mergers and Acquisitions, Corporate Governance, Shareholder Activism", "Posted in SEC Guidance", "https://www.clearymawatch.com/2016/01/bitcoins-and-blockchain-the-use-of-distributed-ledger-technology-for-the-issuance-of-digital-securities/", Dated Jan. 4, 2016, Retrieved on Feb. 20, 2018, pp. 1-7. Publisher: Cleary Gottlieb Steen & Hamilton LLP.
Metz, "SEC Approves Plan to Issue Stock Via Bitcoin's Blockchain", "Wired, Business", "https://www.wired.com/2015/12/sec-approves-plan-to-issue-company-stock-via-the-bitcoin-blockchain/", Dated Dec. 15, 2016, Retrieved on Mar. 27, 2018, pp. 1-7.
Nitchman, "First Public Offering Using Blockchain Planned", "XBRL", "https://www.xbrl.org/first-public-offering-using-blockchain-planned/", Posted on Mar. 18, 2016, Retrieved on Feb. 20, 2018, pp. 1-3, Publisher: XBRL International Inc.
Prisco, "Overstock Files Crypto Stock Exchange Prospectus with the SEC", "Bitcoin Magazine", "https://bitcoinmagazine.com/articles/overstock-files-crypto-stock-exchange-prospectus-sec-1430258150/", Dated Apr. 28, 2015, Retrieved on Feb. 20, 2018, pp. 1-5.

Richards, "Wall Street Left Out in Overstock's US $500M Stocks Issue", "CoinTelegraph", "https://cointelegraph.com/news/wall-street-left-out-in-overstocks-us500m-stocks-issue", Dated Apr. 28, 2015, Retrieved on Feb. 20, 2018, pp. 1-4, Publisher: Cointelegraph.
The International Bureau of WIPO; "Notification Concerning Transmittal of Copy of International Preliminary Report on Patentability from PCT Application No. PCT/US2016/069544 dated Jul. 12, 2018"; from Foreign Counterpart of U.S. Appl. No. 15/396,030; pp. 1-7; Dated Jul. 12, 2018; Published: Switzerland.
U.S. Patent and Trademark Office, "Restriction Requirement" U.S. Appl. No. 15/141,582; dated Jun. 19, 2018; pp. 1-6, Published in: US.
U.S. Patent and Trademark Office, "Third-Party Submission Under 37 CFR 1.290 Concise Description of Relevance", "U.S. Appl. No. 15/396,030", dated May 30, 2017, pp. 1-192, Published in: US.
Vakta et al., "Blockchain Disruption in Security Issuance", "Capgemini", "https://www.capgemini.com/wp-content/uploads/2017/07/blockchain_securities_issuance_v6_web.pdf", Dated Jul. 12, 2017, Retrieved Mar. 27, 2018, pp. 1-16.
Van Eyk, "Overstock.com Seeks to Build New Stock Market", "Bitcoin Magazine", "https://bitcoinmagazine.com/articles/overstock-com-seeks-build-new-stock-market-1412623808/", Dated Oct. 6, 2014, Retrieved on Feb. 20, 2018, pp. 1-5.
Zacks, "MasterCard (MA) Files for Blockchain Patents, Introduces AI", "Zacks Equity Research", "https://www.yahoo.com/news/mastercard-ma-files-blockchain-patents-151203016.html", Dated Dec. 1, 2016, Retrieved on Feb. 20, 2018, pp. 1-8.
Mills et al., "Distributed ledger technology in payments, clearing, and settlement", Finance and Economics Discussion Series Divisions of Research & Statistics and Monetary Affairs Federal Reserve Board, Washington, D.C., 2016, pp. 1-37.
U.S. Patent and Trademark Office, "Notice of Allowance", U.S. Appl. No. 15/164,341, dated Sep. 20, 2019, pp. 1-24, Published: US.
U.S. Patent and Trademark Office, "Corrected Notice of Allowability", Application No. 15/164,341, dated Nov. 22, 2019, pp. 1-4, Published: US.
Japanese Patent Office, "Notice of Reason for Rejection from JP Application No. 2017559778", from Foreign Counterpart to U.S. Appl. No. 15/017,359, dated Oct. 3, 2019, pp. 1-7, Published: JP.
Watanabe et al., "Technology and Challenged of Blockchain Platforms", The Institute of Electronics, Information and Communication Engineers, IEICE Tech. Rep., Jul. 2017, pp. 1-12, vol. 117, No. 114, IEICE.
Suga, "Bitcoin ECDSA Quick cash exploitations with bungled ECDSA signature modules in Bitcoin system", The 31st Symposium on Cryptography and Information Security, Jan. 2014, pp. 1-8, The Institute of Electronics, Information and Communication Engineers.
Intellectual Property Office of Singapore, "Notice of Eligibility for Grant and Examination Report from SG Application No. 11201709186S dated Jul. 18, 2019", from Foreign Counterpart to U.S. Appl. No. 15/164,341, pp. 1-7, Published: SG.
European Patent Office, "Summons to attend oral proceedings pursuant to Rule 115(1) EPC from EP Application No. 16766103.2", from Foreign Counterpart to U.S. App. No. 15/017,359, dated Jan. 17, 2020, pp. 1-8, Published: EP.

\* cited by examiner

US 10,673,634 B2

CRYPTO INTEGRATION PLATFORM

CROSS-REFERENCE TO RELATED APPLICATION

This application is a continuation application of U.S. patent application Ser. No. 15/017,359 entitled "CRYPTO INTEGRATION PLATFORM" and filed on Feb. 5, 2016 (currently pending) which is a non-provisional of and claims priority to U.S. Provisional Application No. 62/113,931, filed on Feb. 9, 2015, entitled "CRYPTO INTEGRATION PLATFORM," which is hereby incorporated by reference in its entirety for all purposes.

TECHNICAL FIELD

Various embodiments of the present disclosure generally relate to trading. More specifically, various embodiments of the present disclosure relate to systems and methods for trading digital transactional items such as assets, liabilities, commodities, and/or currencies using distributed and cryptographic ("crypto") techniques.

BACKGROUND

Recent increasing adoption of crypto currencies (e.g., Bitcoin) worldwide creates challenges for existing trading systems. For example, market data and ownership data are stored differently. Additionally, existing trading systems use protocols for pre-trade communications and execution that are not compatible with trading systems that trade digital transactional items.

The present disclosure overcomes these and other limitations of existing trading systems, and provides other benefits as will become clearer to those skilled in the art from the following description.

BRIEF DESCRIPTION OF THE DRAWINGS

Embodiments of the present disclosure will be described and explained through the use of the accompanying drawings in which.

DETAILED DESCRIPTION

Figure 1:
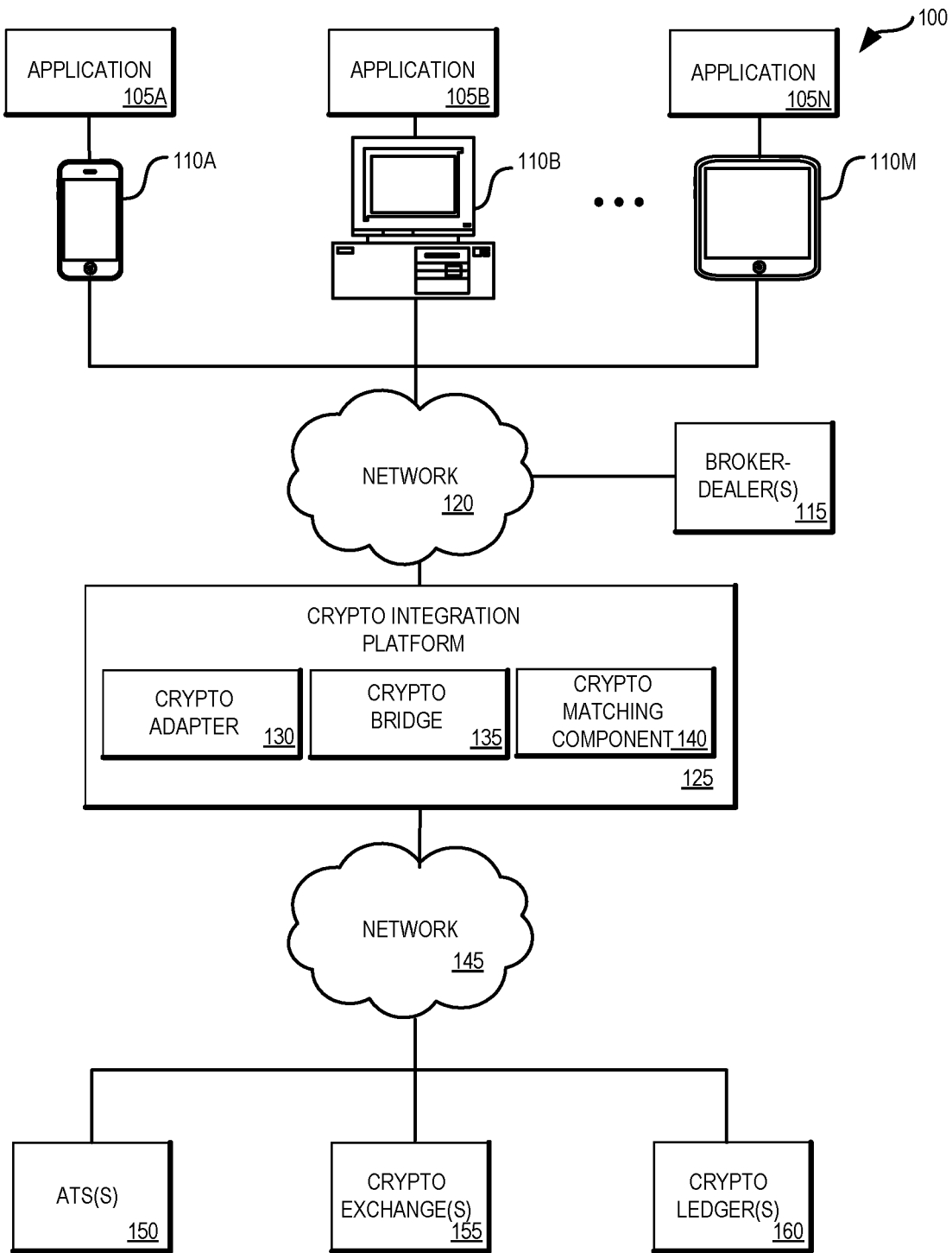
FIG. 1 illustrates an example of a network-based operating environment in accordance with various embodiments of the disclosure.

Various embodiments of the present disclosure generally relate to trading digital transactional items, more particularly digital assets, such as securities. More specifically, various embodiments of the present disclosure relate to systems and methods for trading digital securities using distributed and cryptographic techniques, and, in particular, a Crypto Integration Platform. The Crypto Integration Platform receives orders to trade digital transactional items such as digital assets, liabilities, commodities, and/or currencies (e.g., digital securities, digital interests in securities, crypto currencies) for other digital transactional times such as digital representations of funds (e.g., tokens, cash, cash equivalents such as crypto currencies) on a cryptographic ("crypto") exchange (i.e., an exchange that trades digital transactional items) from broker-dealers and translates the orders into crypto orders.

The Crypto Integration Platform aggregates market information from the crypto exchanges and serves as a router to locate the best price in the crypto market for the digital asset or liability involved in the transaction. Prior to matching orders, the Crypto Integration Platform secures both the digital transactional items (i.e., the funds for a buy order and the digital assets or liabilities for a sell order) and cryptographically signs the transactions. Once a potential matching order has been located, the Crypto Integration Platform verifies that the funds and the digital assets/liabilities are available for trade (e.g., associated with addressed accounts owned by the buyer and the seller) and clears and settles the transaction instantaneously by associating the funds and digital assets or liabilities with corresponding addressed accounts.

Benefits of the Crypto Integration Platform include guaranteed settlement, transparency of ownership and easy money movement, and secure settlements. Cryptographically signing the transactions ensures authentication, authorization, and provenance.

The Crypto Integration Platform provides, among other things, an interface between legacy trading systems and crypto exchanges that trade digital transactional items. In doing so, the Crypto Integration Platform takes a protocol for trading and communication between broker-dealers, Alternative Trading Systems ("ATS"), and exchanges, and transforms the message so that the trade can be consummated using cryptographic techniques. For example, one protocol is the Financial Information eXchange protocol or "FIX" protocol. The Crypto Integration Platform allows broker-dealers to integrate the technology described herein on the backend of legacy trading systems, opening up legacy trading systems to crypto exchanges. Thus, the Crypto Integration Platform allows more companies to enjoy access to capital and more investors to enjoy access to shares of the participating companies. Messages in the FIX protocol are used in many examples in the present disclosure. However, the Crypto Integration Platform can receive and transform messages in protocols other than the FIX protocol to be consummated using cryptographic techniques.

The Crypto Integration Platform uses crypto ledgers or distributed ledgers (e.g., block chains) to verify ownership and availability of the digital transactional items being exchanged. The Crypto Integration Platform, or components of it, may be used by securities issuers to conduct initial public offerings and other SEC-registered public offerings of securities, and by the general public to trade those securities in secondary market transactions.

The digital transactional items traded on crypto exchanges may be transferred to other owners using cryptographic techniques such as public-key cryptography and bidirectional encryption, as well known in the art. Public-key cryptography requires a key pair, where the two keys are mathematically linked. One key is a public key that is freely shared among nodes in a peer-to-peer network. The other key is a private key that is not shared with the public. The public key is used to encrypt plaintext and to verify a digital signature. The private key is used to decrypt cipher text and to digitally sign transactions. Transaction messages may be digitally signed by the sender's private key to authenticate the sender's identity. Then, the sender's digitally-signed transaction message may be decrypted using the sender's public key to verify that the sender originated the transaction.

Ownership of the digital transactional items may be based on ownership entries in distributed ledgers that are maintained by network nodes. The distributed ledgers (e.g., block chain for Bitcoin) record entries for each change of ownership of each digital transactional item and may be mathematically linked to the key pairs. To sell a digital asset or digital liability, a transaction message (e.g., in packets or other data structures) may be broadcast to nodes on a peer-to-peer network. The transaction message can be signed by the seller's private key and may include information such as a history of the chain of title of the digital asset or digital liability, the number of shares or items being transferred and the purchaser's public key-based address. When a majority of the nodes in the network agree that the sender has the proper chain of title, ownership is changed to the purchaser and the ledger is updated to indicate the transaction.

Integrating a crypto trading system (i.e., a system that trades digital assets or liabilities on a crypto exchange) into a traditional trading system creates challenges that the present disclosure addresses. For example, this disclosure introduces a process in which orders to trade digital assets or liabilities are submitted via a legacy system. In another example, this disclosure introduces a process to ensure that a crypto trading order originally received into the legacy system is authorized by the same entity as the original order. Additionally, this disclosure introduces a system and method for matching cryptographic transactions based on non-shared private keys and shared public keys.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 includes applications 105A-105N running on one or more computing devices 110A-110M (such as a mobile device, a mobile phone, a tablet computer, a mobile media device, a mobile gaming device, a vehicle-based computer, a dedicated terminal, a public terminal, desktop or laptop computer, a kiosk, etc.). In some embodiments, applications 105A-105N are used for carrying out operations such as generating orders, and checking account balances may be stored on the computing devices or may be stored remotely. These computing devices can include mechanisms for receiving and sending traffic by connecting through network 120 to Crypto Integration Platform 125 and broker-dealer(s) 115.

Computing devices 110A-110M are configured to communicate via network 120 with broker-dealer(s) 115 and Crypto Integration Platform 125. In some embodiments, computing devices 110A-110M can retrieve or submit information to Crypto Integration Platform 125 and run one or more applications with customized content retrieved by Crypto Integration Platform 125 and broker-dealer 115. For example, computing devices 110A-110M each can execute a browser application or a customized client to enable interaction between the computing devices 110A-110M and Crypto Integration Platform 125 and broker-dealer 115.

Broker-dealer(s) 115 are entities (i.e., natural persons, companies, or other organizations) that engage in the business of trading assets (e.g., securities, mutual fund shares, etc.) for their own account or on behalf of their customers. When executing trade orders on behalf of a customer, the entity acts as a broker. When executing trades for its own account, the entity acts as a dealer. Broker-dealer(s) 115 may receive orders from computing devices 110A-110M or create their own orders. Broker-dealer(s) 115 may communicate orders to Crypto Integration Platform 125 via network 120. The orders sent by broker-dealer(s) 115 may use the FIX protocol or other protocols and/or formats.

Crypto Integration Platform 125 can run on one or more servers and can be used to trade digital transactional items. In some embodiments, as illustrated, Crypto Integration Platform 125 includes a Crypto Adapter 130, Crypto Bridge 135, and Crypto Matching Component 140.

Crypto Adapter 130 receives orders for trading digital transactional items from broker-dealer(s) 115 and, in some embodiments, directly from computing devices 110A-110M. The orders are received by Crypto Adapter 130 in a conventional protocol/format commonly used by broker-dealer(s) 115 (e.g., FIX messages). Crypto Adapter 130 translates the orders into cryptographic transactions, verifies ownership of assets and funds in the orders using Crypto Ledger(s) 160, cryptographically signs the cryptographic transactions to transfer assets and funds, and verifies that the cryptographic transaction is authorized by the same customer authorizing the FIX order. Crypto Bridge 135 aggregates and provides market data from Crypto Exchange(s) 155 to broker-dealer(s) 115. Crypto Matching Component 140 matches buy and sell orders of the digital assets, executes the orders, and returns execution reports to broker-dealer(s) 115 in the existing broker-dealer(s)'s format. Thus, the Crypto Integration Platform 125 seamlessly integrates into the operations of current broker-dealer(s) 115 to allow broker-dealer(s) 115 to trade securities on Crypto Exchange(s) 155 without knowledge of public or private keys, ledgers, and block chains.

Crypto Integration Platform 125 is communicably coupled with one or more ATS 150, Crypto Exchange(s) 155, and Crypto Ledger(s) 160 through network 145.

Network 120 and network 145 can be the same network or can be separate networks and can be any combination of local area and/or wide area networks, using wired and/or wireless communication systems. Either network 120 or network 145 could be or could use any or more of the following protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 120 and network 145 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 120 and network 145 may be represented using technologies, languages and/or formats including hypertext markup language (HTML) or extensible markup language (XML). In addition, all or some links can be encrypted using conventional encryption technologies such as secure sockets layer (SSL), transport layer security (TLS), and Internet Protocol security (Ipsec).

ATS(s) 150 are non-exchange trading systems that find counterparties for transactions by matching buyers and sellers. ATS(s) 150 are an alternative to traditional stock exchanges. Examples of ATS(s) 150 include electronic communication networks (ECNs), crossing networks, dark pools, and call markets. ATS(s) 150 receive digitally signed FIX orders from Crypto Integration Platform 125, find potential buy/sell order matches to trade digital assets, and contain a state of the order book which records the state of the orders.

Crypto Exchanges(s) 155 are exchanges that trade digital transactional items such as digital shares of stock, bonds, or currency. Digital shares of stock may be of the same class of stock as securities listed on traditional exchanges. Ownership of the digital transactional items in Crypto Exchange(s) 155 can be recorded on one or more distributed ledgers such as Crypto Ledger(s) 160. Crypto Exchange(s) 155 receive digitally signed crypto transactions (e.g., orders, cancellations) from Crypto Integration Platform 125.

Crypto Ledger(s) 160 record economic transactions such as the sale of digital assets or liabilities in exchange for funds. Crypto Ledger(s) 160 vary per unit. For example, Bitcoin uses a distributed public ledger called the block chain. When Crypto Ledger(s) 160 receives a transaction signed with the proper key from Crypto Integration Platform 125 and the transaction is verified by network nodes, the Crypto Ledger(s) 160 moves the digital transactional items to the proper address (e.g., the proper wallet) by recording the transaction (e.g., adding a block chain into the ledger).

Various data stores can be used to manage storage and access to digital securities, user information, and other data. The data stores may be distributed data stores such as Crypto Ledger(s) 160. The data stores may be a data repository of a set of integrated objects that are modeled using classes defined in database schemas. Data stores may further include flat files that can store data. Crypto Integration Platform 125 and/or other servers may collect and/or access data from the data stores.

Figure 2:
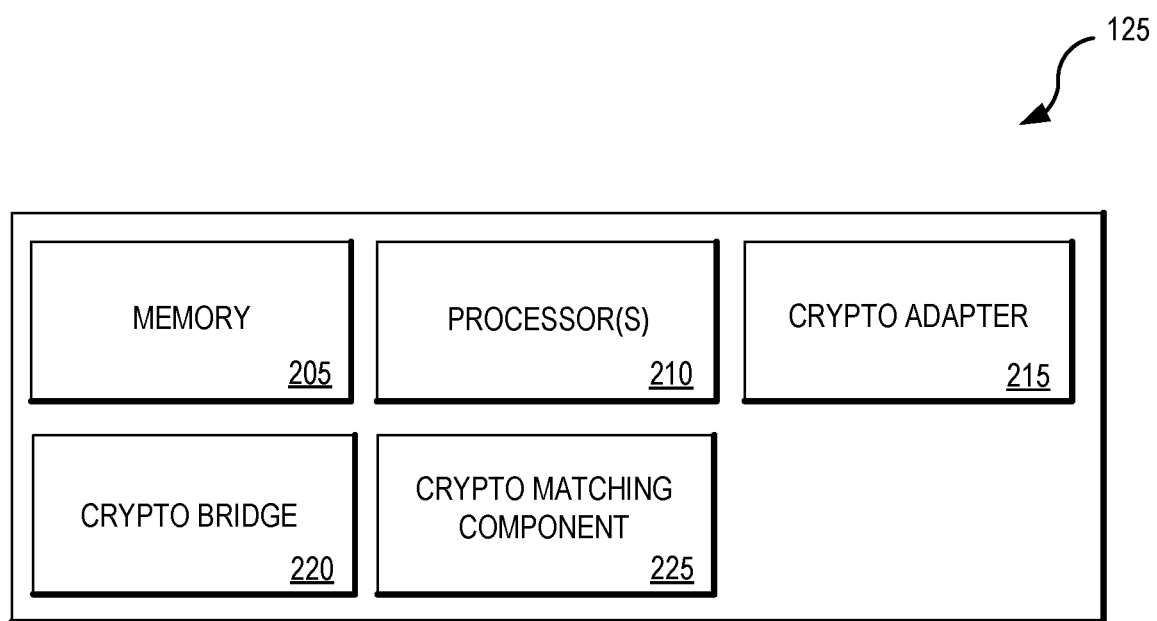
FIG. 2 illustrates a set of components in a Crypto Integration Platform according to one or more embodiments of the present disclosure.

FIG. 2 illustrates a set of components within Crypto Integration Platform 125 according to one or more embodiments of the present disclosure. According to the embodiments shown in FIG. 2, Crypto Integration Platform can include memory 205, one or more processor(s) 210, Crypto Adapter 215, Crypto Bridge 220, and Crypto Matching Component 225. Other embodiments may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, Crypto Bridge 220 and Crypto Matching Component 225 can be combined into a single component.

Memory 205 can be any device, mechanism, or populated data structure used for storing information. In accordance with some embodiments of the present disclosure, memory 205 can be or include, for example, any type of volatile memory, nonvolatile memory, and dynamic memory. For example, memory 205 can be random access memory, memory storage devices, optical memory devices, magnetic media, floppy disks, magnetic tapes, hard drives, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of Crypto Adapter 215, Crypto Bridge 220, and Crypto Matching Component 225.

Crypto Adapter

Crypto Adapter 215 serves as the interface between broker-dealers and crypto exchanges. Crypto Adapter 215 communicates with Crypto Bridge 220 to provide market data to the broker-dealers from the crypto exchanges. Crypto Adapter 215 also integrates new customers by storing a customer identifier provided by the broker-dealer and generating two separate key pairs. Each key pair has one private key and one public key. The two parts of the key pair are mathematically linked. The public key of a key pair may be published without compromising security, whereas the private key of a key pair must not be revealed to anyone not authorized to read messages or perform digital signatures.

The two key pairs are used to create two addressed accounts associated with the customer identifier. The addressed accounts may be referred to as "wallets." Both wallets represent digital accounts. The first wallet, referred to at times, herein as the customer portfolio wallet, stores digital transactional items such as digital assets and liabilities (e.g., digital shares of stocks) and digital funds (e.g., digitized dollars, tokens, crypto currency). In some embodiments, the customer associated with the customer identifier owns the key pair for the wallet, but authorizes Crypto Adapter 215 to use the key pair to complete transactions on behalf of the customer. In other embodiments, Crypto Adapter 215 or a third party owns the customer portfolio wallet. The second wallet, referred to at times herein as the customer committed wallet, stores digital transactional times that the customer has placed in buy or sell orders that have not yet been completed (e.g., "committed" assets or funds). Crypto Adapter 215 either owns the keys for the customer committed wallet or is authorized to use the keys to the customer committed wallet. In some embodiments, a parent wallet may be created that includes many different customer portfolio wallet and customer committed wallet keys. The parent wallet may include keys for different public ledgers thereby providing one master account for a broker-dealer.

Crypto Adapter 215 can receive a request from a broker-dealer to obtain the balance of the wallets. Using the customer identifier, Crypto Adapter 215 can identify the correct customer portfolio wallet and customer committed wallet. Then, Crypto Adapter 215 can use the corresponding public key for the customer portfolio wallet and the customer committed wallet to obtain the balance for each wallet from one or more crypto ledgers.

Crypto Adapter 215 can receive a FIX order message (or similar message) that includes a buy, sell, or cancel order associated with a customer identifier from broker-dealers. If the order is a buy order, the FIX order message indicates that the broker-dealer has U.S. dollars (or other currency) for the transaction on deposit. Therefore, Crypto Adapter 215 issues a representation that funds from the customer are being held at the broker-dealer specifically to settle the trade. The representation can be a digital liability or IOU from the broker-dealer. Such digital representation may be stored in or associated with the customer portfolio wallet. In some embodiments, the funds could be sent via a crypto currency transaction from a wallet (i.e., addressed account) of a broker-dealer to the customer portfolio wallet.

Crypto Adapter 215 creates a crypto committed transaction (i.e., a transaction involving buying or selling digital assets or liabilities on the crypto exchange) for the buy order which includes information for the transfer of digital liabilities from a source account (i.e., customer portfolio wallet) to a destination account (i.e., customer committed wallet) and signs the crypto committed transaction with the private key of the customer portfolio wallet. The crypto committed transaction may include the USD token, the customer identifier, and/or the public key of the committed wallet. After the transaction is signed by the Crypto Adapter 215 and verified by the network nodes, the transfer of the USD token to the customer committed wallet is completed and the transaction is updated in the crypto ledger.

In addition to creating a crypto committed transaction, Crypto Adapter 215 creates a FIX order transaction. To create the FIX order transaction, Crypto Adapter 215 takes a non-crypto FIX order, maps the customer to a set of wallets and keys using the customer identifier, and creates and signs the FIX transaction with the customer portfolio wallet private key. The FIX transaction may be enriched with the output of the crypto order transaction, specifically a transaction identifier or hash of the crypto transaction order. The FIX order transaction can include a message type (e.g., buy, sell), order identifier, funding transaction hash, return account, and a public key. Before sending the FIX order transaction to the ATS, the signature authorizing the FIX order transaction is compared to the signature authorizing the crypto committed transaction. If the signatures match, then the order can be sent to the ATS. Thus, signing the FIX order transaction and the crypto order transaction with the same private key allows Crypto Adapter 215 to mathematically verify that the order originated from the same entity. This prevents attackers from monitoring the public ledger and trying to create fraudulent orders which appear to be backed by a committed order.

Crypto Adapter 215 routes the signed FIX order transaction to an ATS to find a potentially matching sell order. Crypto Adapter 215 routes the signed crypto committed transaction to Crypto Bridge 220, which eventually routes the signed crypto committed transaction to a crypto exchange to find a matching sell order. As discussed below, Crypto Bridge 220 compares the signatures on the FIX order transaction and the crypto committed transaction. Public-key cryptography can be used to determine whether the signatures match. Crypto Adapter 215 also creates and delivers execution reports to the broker-dealer informing the broker-dealer that the buy order is pending. Crypto Adapter 215 also receives execution reports from the Crypto Matching Component 225 that Crypto Adapter 215 forwards to broker dealers.

Crypto Adapter 215 processes sell orders in much the same manner as buy orders except that Crypto Adapter 215 does not issue a USD token or other digital representation because the digital security is backed by the organization that issued it.

Crypto Adapter 215 receives cancel orders from broker-dealers. Crypto Adapter 215 receives a cancel order request and maps customer identifiers to customer committed wallets. After obtaining wallet balances from one or more crypto ledgers, Crypto Adapter creates a FIX cancel transaction and signs the transaction with the customer committed wallet private key. After Crypto Adapter 215 verifies that the FIX cancel transaction was signed by the same private key as the original crypto order transaction (e.g., using public-key cryptography), a crypto cancel transaction order is created. Crypto Adapter 215 signs the crypto cancel transaction with the customer committed wallet private key to effectuate the transfer of the funds or assets to the customer portfolio wallet by the crypto ledger. Signing the crypto cancel transaction ensures that the entity originating the cancel order is authorized to do so. This prevents attackers from surreptitiously removing orders to front run the transactions.

Crypto Bridge

Crypto Bridge 220 receives requests for market data on the crypto exchanges from Crypto Adapter 215. Crypto Bridge 220 aggregates information from the crypto exchanges and serves as a router to locate the best price in the crypto market for the security involved in the transaction. The Crypto Bridge can aggregate the data by monitoring crypto ledgers to generate a current snapshot of the order book by subscribing to order information which is visible on the public ledger. The crypto exchanges may have different distributed ledgers. Crypto Bridge 220 further provides a single interface for broker-dealers by normalizing different distributed ledgers. For example, various distributed ledgers may be used and these distributed ledgers may have different application programming interfaces with different associated keys. Crypto Bridge 220 accesses the data from all the distributed ledgers and provides the data in one standard format. Thus, broker-dealers enjoy access to a crypto exchange without dealing with disparate wallet and key generation, committed transactions, retrieval of balances, among other things.

Crypto Matching Component

Crypto Matching Component 225 receives a match request from an ATS that identifies two committed orders (i.e., orders in which the digital transactional items have been transferred to the customer committed wallets) that are potentially a match. The match request includes the order identifiers for each committed transaction. Crypto Matching Component 225 maps order identifiers to the committed customer portfolio wallet for each order. Crypto Matching Component 225 obtains the balances of the customer committed wallets from the crypto ledger to ensure that from the selling side, the asset or liability is available and committed for the transaction, and from the buying side, that the funds are available and committed for the transaction. Crypto Matching Component matches the request response and includes the counterparty hashes or signatures from the customer portfolio wallets. Crypto Matching Component then settles and clears the transactions by deducting from the customer committed wallets and crediting the customer portfolio wallets for each party using the counterparty hashes or signatures from the customer portfolio wallets.

Figure 3:
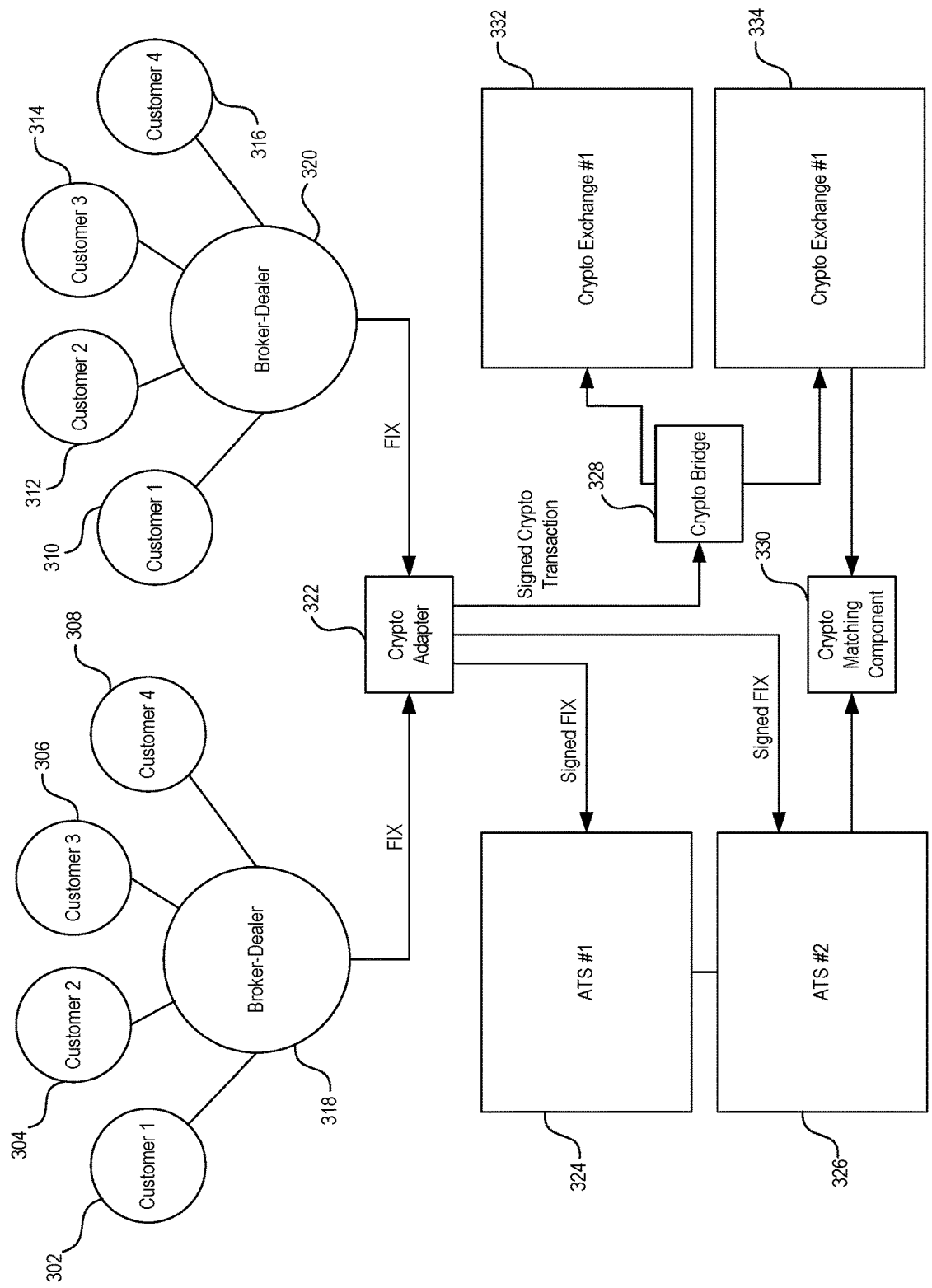
FIG. 3 is a diagram illustrating interaction of components used in trading digital transactional items.

FIG. 3 is a diagram illustrating interaction of components used in trading digital assets. As shown in FIG. 3, customers (302, 304, 306, 308, 310, 312, 314, 316) interface with broker-dealers (318, 320). The broker-dealers receive orders from the customers to trade non-digital assets or liabilities on traditional exchanges as well as orders to trade digital assets or liabilities on crypto exchanges (332, 334). If an order involves trading digital transactional items, the order is routed to the Crypto Adapter (322) in a standard format for broker-dealers such as FIX orders. Using cryptographic techniques, the Crypto Adapter (322) transfers the digital transactional items corresponding to the order from the customer portfolio wallet to the customer committed wallet, which creates a "signed crypto transaction." The signed crypto transaction is sent to the Crypto Bridge (328). Then, the Crypto Adapter (322) creates and signs a FIX transaction order which is sent to one or more ATSs (324, 326). The Crypto Adapter (322) verifies that the FIX transaction and the crypto transaction were authorized by the same party by comparing cryptographic signatures.

Assuming that the signatures match, Crypto Matching Component (330) receives a potential match for the orders from one or the ATSs (324, 326) or one of the Crypto Exchanges (332, 334). In some embodiments, the orders can be sent to more than one ATS and/or more than one Crypto Exchanges. The Crypto Matching Component verifies that the digital transactional items are available and instantaneously clears and settles the transaction.

Figure 4:
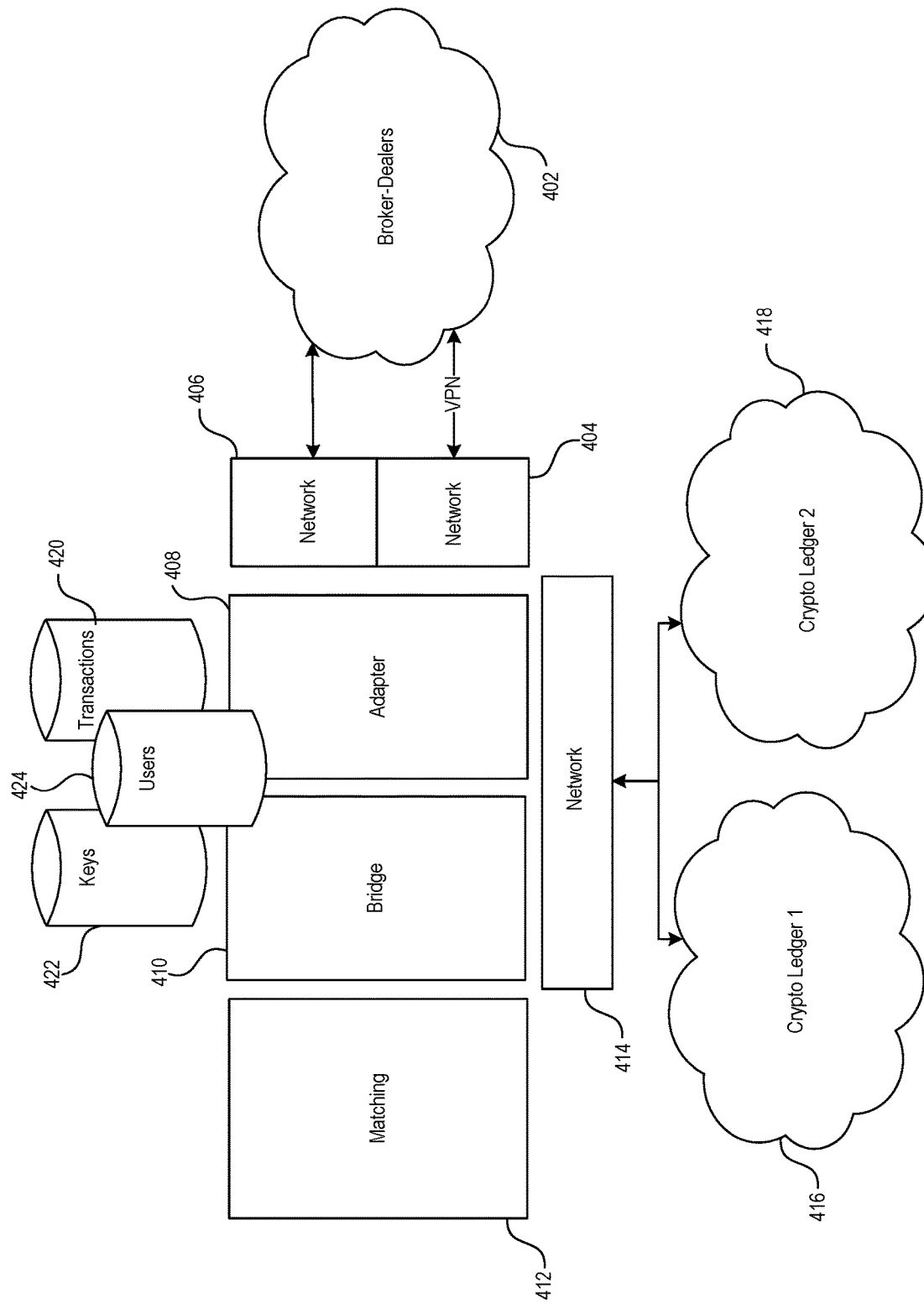
FIG. 4 is a diagram illustrating an architecture of a Crypto Integration Platform.

FIG. 4 is a diagram illustrating an architecture of a Crypto Integration Platform 125. As shown, broker-dealers (402) communicate with the Crypto Integration Platform 125 (408, 410, 412) via one or more networks (404, 406). The Crypto Integration Platform 125 communicates with crypto ledgers (416, 418) via one or more networks (414). Once an order to purchase or sell digital transactional items, or to cancel an order, is received by broker-dealers (402), adapter (408) creates a transaction on the legacy system that will be sent to an ATS and to a cryptographic exchange. Information including wallet keys, user information, and transactions are created and stored in databases (420, 422, 424) and on various distributed ledgers (416, 418). Assets are verified and moved into the customer committed wallets and the transactions are signed. Market data is gathered from distributed public ledgers such as the block chain. As shown with the multiple crypto ledgers (416, 418), the transaction is agnostic to the type of distributed ledger used to record the transaction. Bridge (410) normalizes the market data from the various cryptographic exchanges. Orders are matched in the matching component (412).

Figure 5:
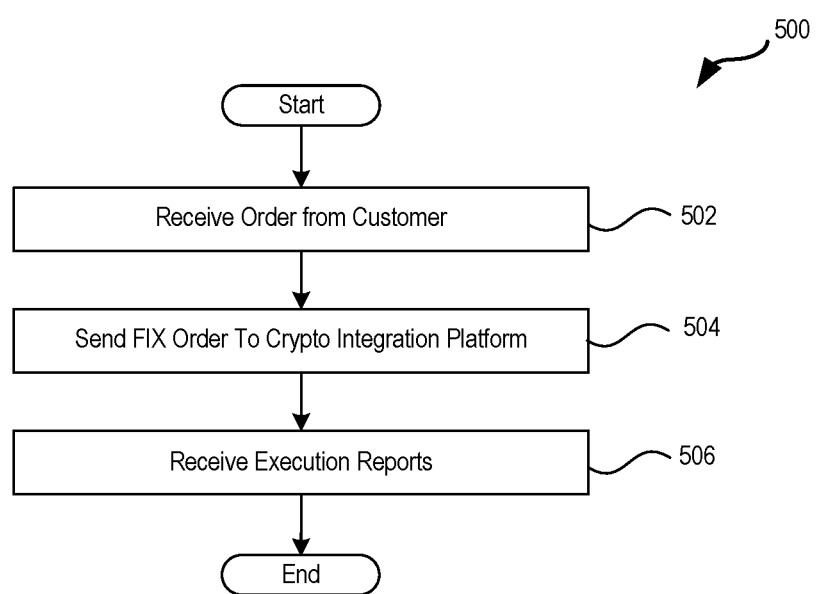
FIG. 5 is a flowchart illustrating a process of trading digital transactional items from the perspective of a broker-dealer.

FIG. 5 is a flowchart illustrating a process 500 of trading digital assets from the perspective of a broker-dealer, using the Crypto Integration Platform. Receiving operation 502 receives an order from a customer at a computing device of a broker-dealer. The order may include an order to buy or sell one or more digital transactional items, or an order to cancel a pre-existing order. Upon receiving the order, the broker-dealer may create an order message in the FIX protocol (or other protocol) and send the order to the Crypto Integration Platform in sending operation 504. After the Crypto Integration Platform checks the customer account balances (i.e., balances of the customer portfolio wallet and the customer committed wallet) and commits the digital funds or asset to the order, the broker-dealer receives execution reports with the status of the order (e.g., order pending, order executed, order cancelled) in receiving operation 506. The execution reports are provided in the same format that the broker-dealer receives from trades that take place on typical exchanges.

Figure 6:
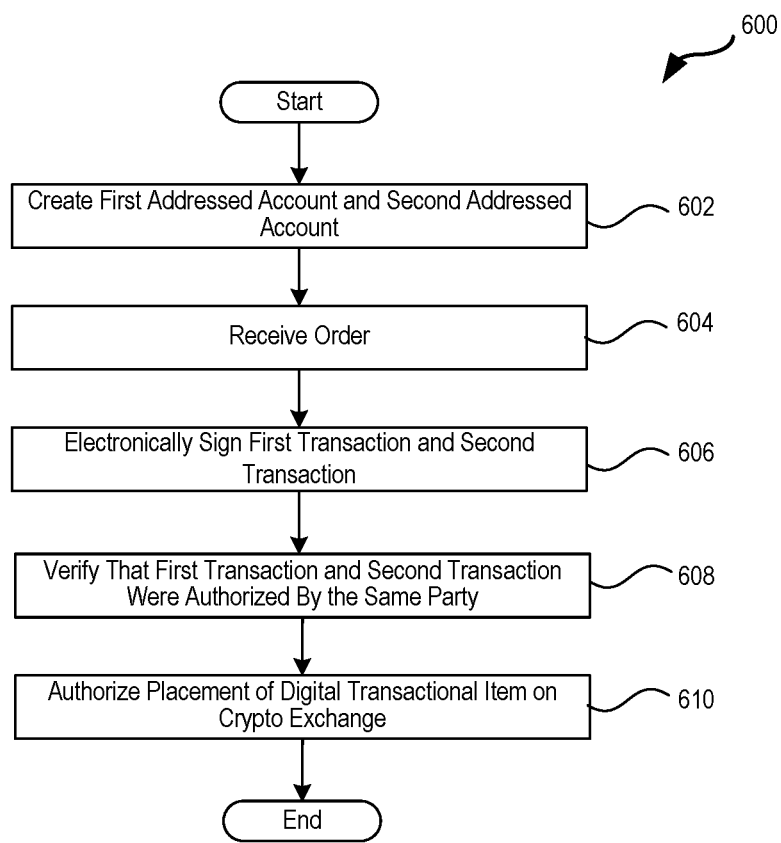
FIG. 6 is a flowchart illustrating a process of trading digital transactional items.

FIG. 6 is a flowchart illustrating a process 600 of trading digital transactional items from the perspective of the Crypto Integration Platform. In some embodiments, the operations performed in FIG. 6 can be performed by the Crypto Adapter. In some embodiments, fewer or more operations may be performed or the operations may be performed in different orders.

Creating operation 602 creates a first addressed account (e.g., customer portfolio wallet) and a second addressed account (e.g., customer committed wallet) for a customer. The first and second addressed accounts can each have an associated key pair and may both be associated with a customer identifier. Various digital transactional items owned by the customer can be associated with the first and second addressed accounts. Receiving operation 604 receives an order to buy or sell digital transactional items such as a digital security.

Signing operation 606 can electronically sign a first transaction to transfer the digital transactional items from the first addressed account to the second addressed account with a private key associated with the first addressed account. Signing operation 606 can also electronically sign a second transaction with the private key of the first addressed account, a second transaction. Verifying operation 608 verifies that the first transaction was signed with the same private key as the second transaction. Authorizing operation 610 authorizes placement of the digital transactional items on a cryptographic exchange after verifying that the first transaction was signed with the same private key as the second transaction.

Figure 7:
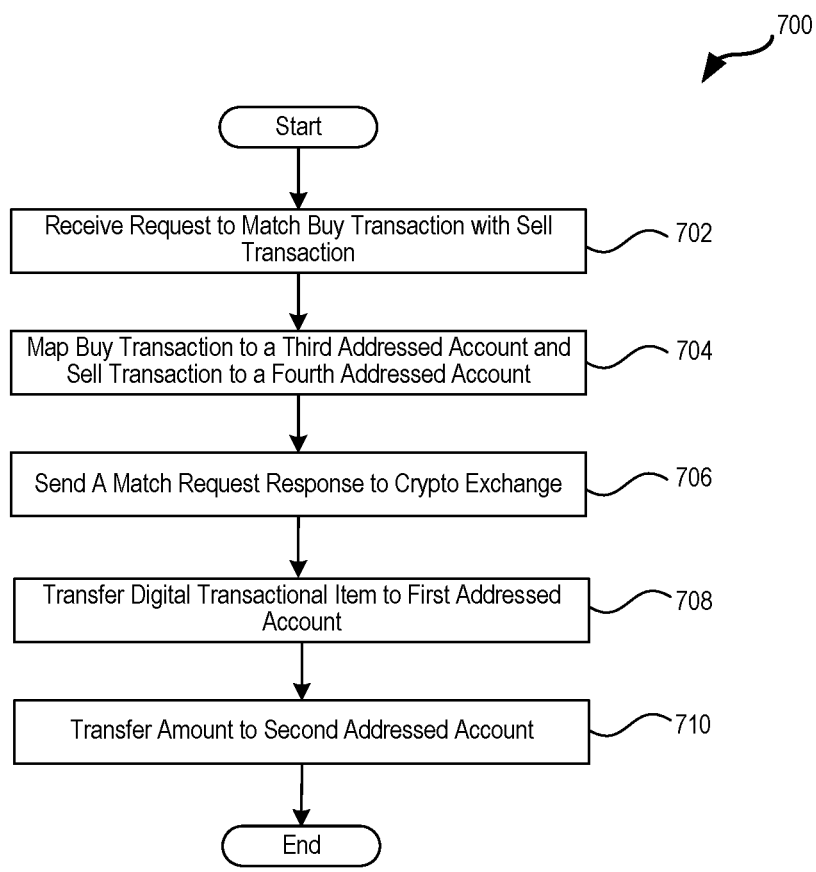
FIG. 7 is a flowchart illustrating a process of trading digital transactional items.

FIG. 7 is a flowchart illustrating a process 700 of trading digital transactional items from the perspective of the Crypto Integration Platform. In some embodiments, the operations performed in FIG. 7 can be performed by the Crypto Matching Component. In some embodiments, fewer or more operations may be performed or the operations may be performed in different orders.

Receiving operation 702 receives a request to match a buy transaction with a sell transaction. The buy transaction can include a buy order to purchase digital transactional items for a specified amount (e.g., an amount corresponding to a value of the digital transactional items) and the sell transaction can include a sell order to sell the digital transactional items for an amount. The customer purchasing the digital transactional items can have two addressed accounts: a first customer portfolio wallet and a first customer committed wallet. The customer selling the digital transactional items can also have two addressed accounts: a second customer portfolio wallet and a second customer committed wallet.

The buy transaction can have an associated first signature that corresponds to the first addressed account (e.g., first customer portfolio wallet) that identifies the buy order. The sell transaction can have an associated second signature corresponding to a second addressed account (e.g., second customer portfolio wallet) that identifies the sell order. The amount of funds can be associated with a third addressed account associated with the first customer (e.g., first customer committed wallet) and the one or more digital transactional items can be associated with a fourth addressed account associated with the second customer (e.g., second customer committed wallet).

Mapping operation 704 maps the buy transaction to the third addressed account (e.g., first customer committed wallet) and the sell transaction to a fourth addressed account (e.g., second customer committed wallet).

Sending operation 706 sends a match request response to the cryptographic exchange. The match request can include the first signature and the second signature to commit the buy transaction. Transferring operation 708 transfers the digital transactional items to the first addressed account (e.g., first customer portfolio wallet). Transferring operation 710 transfers the amount to the second addressed account (e.g., second customer portfolio wallet) to settle and clear the buy transaction and the sell transaction.

Creating a Customer

Figure 8:
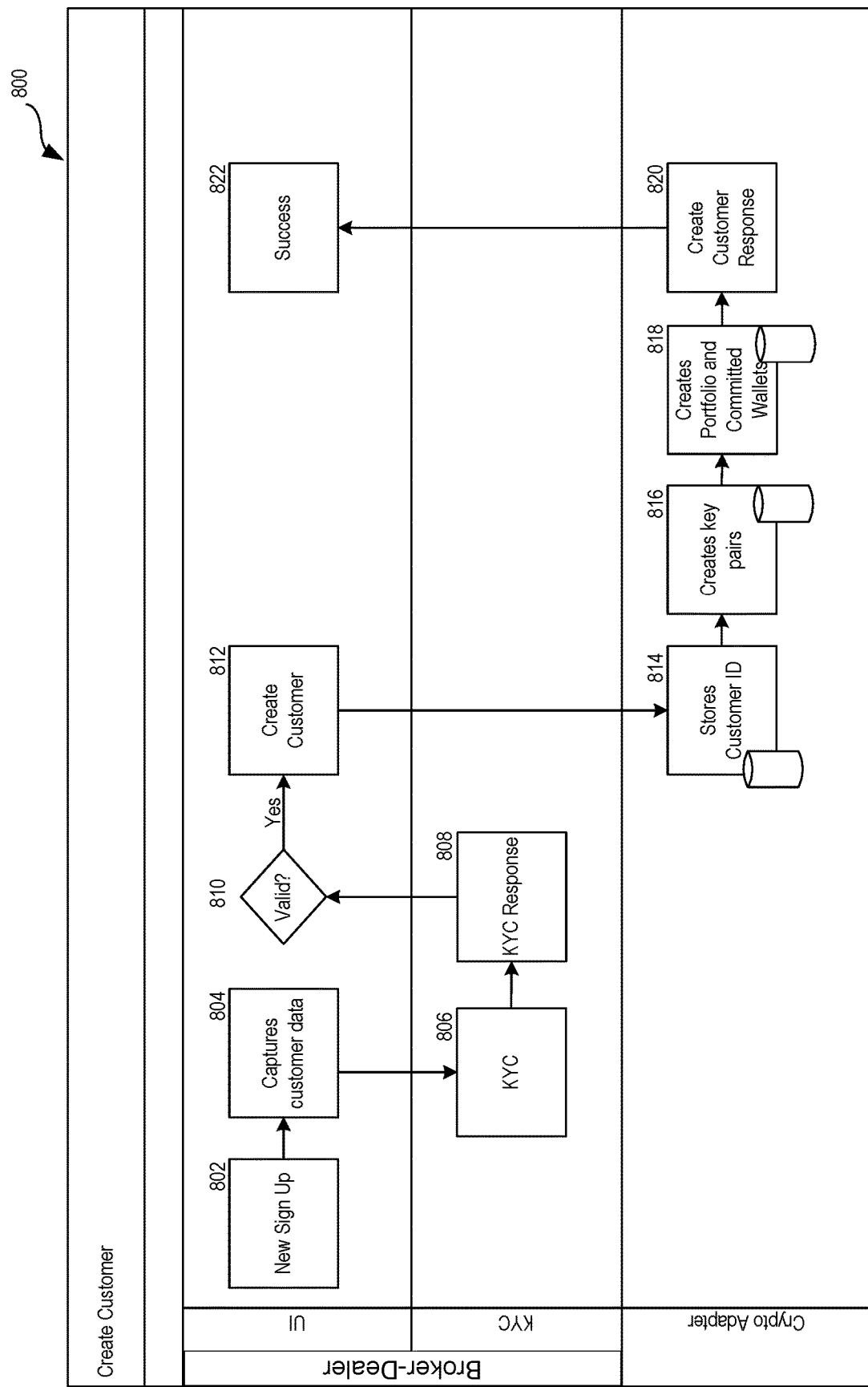
FIG. 8 illustrates a process of integrating a customer into the Crypto Integration Platform to allow the customer to trade digital transactional items.

FIG. 8 illustrates a process 800 of integrating a new customer into the Crypto Integration Platform to allow the customer to trade digital securities. When a user signs up (802), the broker-dealer, via a user interface ("UI"), collects customer data such as name, bank account information, and securities owned by the customer (804). The customer data may be verified in a Know Your Customer ("KYC") process (or other process) (806) that receives data from the customer (808) and verifies the identity of the customer (810). The KYC process may be completed by an outside vendor or by the broker-dealer. If the identity of the customer is verified, the broker-dealer creates the customer in the broker-dealer's system (812). The broker-dealer may assign a customer identifier such as a customer identification number or other identifier to the customer.

Once the broker-dealer assigns the customer identifier to the customer, the customer identifier and customer data can be sent to the Crypto Adapter where the customer identifier and the customer data are stored in one or more databases (814). The Crypto Adapter can generate a key pair (e.g., a public key and a private key pair) for the customer (816) and create a customer portfolio wallet associated with the key pair and the customer identifier (816). The customer portfolio wallet can hold (i.e., be associated with) any digital transactional item such as funds (e.g., digital currency or a representation of currency) and digital assets or liabilities (e.g., digital shares of stock) owned by the customer.

Additionally, a second set of key pairs and a second digital wallet associated with the second set of key pairs and the customer identifier is created (818). The customer committed wallet may be used to secure digital transactional items committed in future orders, akin to an escrow account. Balances of the customer portfolio wallet and the customer committed wallet are recorded in distributed ledgers and can be accessed using the key pairs. In some embodiments, a third party may be commissioned to create the customer portfolio wallet and the customer committed wallet and to generate the corresponding key pairs. Once the customer portfolio wallet and customer committed wallet are created, the Crypto Adapter indicates to the broker-dealer that the customer is successfully created (820). The broker-dealer can receive the indication of successful creation of the customer (822).

Creating an Order

Figure 9:
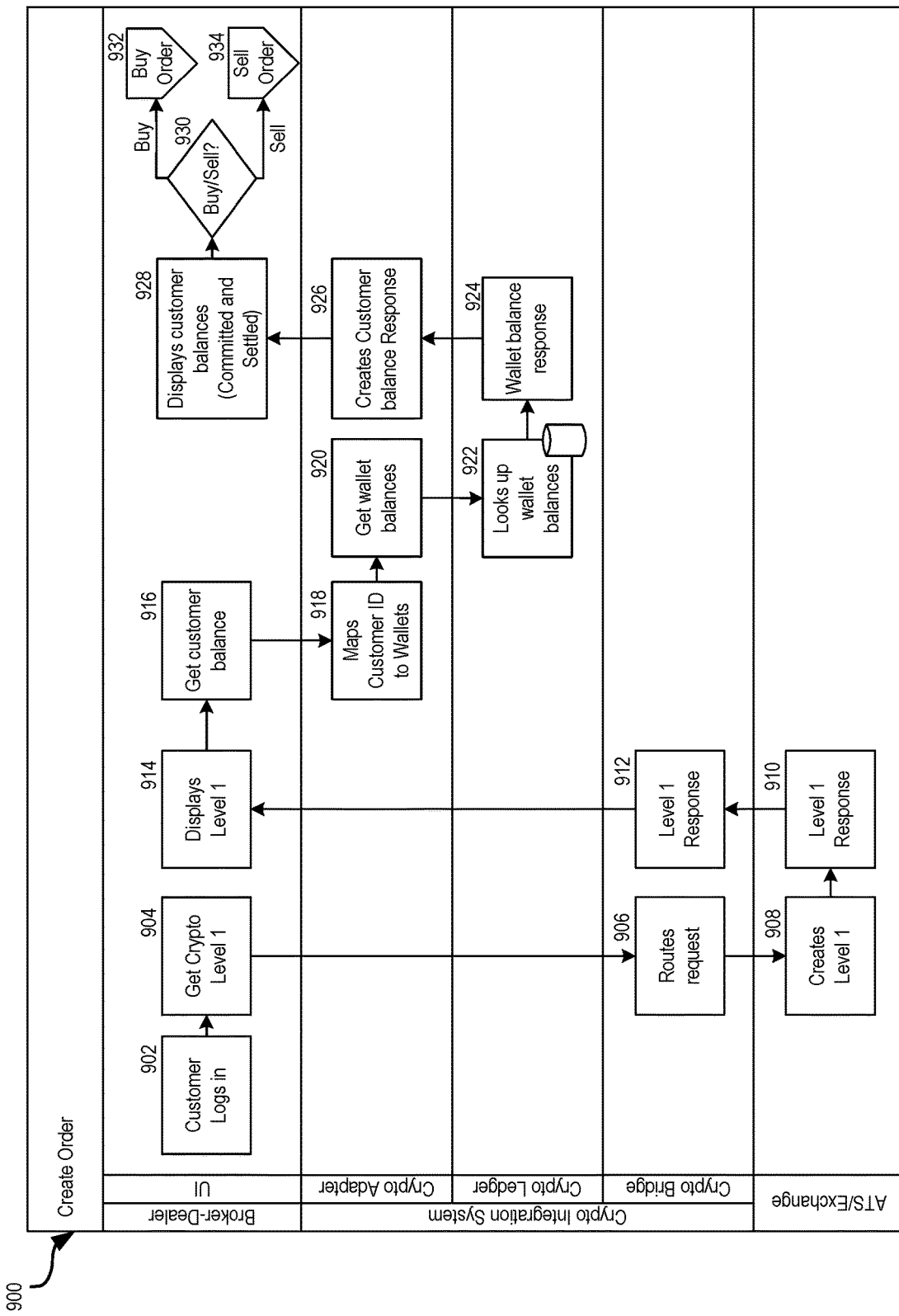
FIG. 9 illustrates a process of creating an order to trade digital transactional items.

FIG. 9 illustrates a process 900 of creating an order to trade digital securities. The customer may login to the broker-dealer via a user interface ("UI"). After the customer logs in (902), broker-dealer may request Crypto Level 1 data (i.e., market data for securities trading on cryptographic exchanges such as the last bid and ask price for one or more securities) (904). This type of data can be used by traders to make buy, bid, and ask decisions for future trades. The request for the Crypto Level 1 data may be routed to the Crypto Bridge (906), which aggregates the data from one or more cryptographic exchanges. The Crypto Bridge retrieves the Crypto Level 1 data from the cryptographic exchanges (908, 910) and normalizes the data to produce the Crypto Level 1 data in a format used by existing systems of broker-dealers (912). In some embodiments, the broker-dealer requests additional data such as Crypto Level 2 data, which provides additional market data such as a history of the orders that have occurred over a period of time. The Crypto Bridge publishes, sends or otherwise makes the Crypto Level 1 data available to the interface of the broker-dealer (914).

The broker-dealer may request the balance of the assets (i.e., securities and digital funds) of the customer portfolio wallet and the customer committed wallet (916). The Crypto Adapter then uses the customer identifier sent by the broker-dealer to map the customer identifier to the customer portfolio wallet and the customer committed wallet (918). The customer portfolio wallet data and the customer committed wallet data are recorded with distributed crypto ledgers as opposed to a database owned by an exchange in typical trading systems today (e.g., New York Stock Exchange owns its trading data) (918). Therefore, to provide the wallet data to the broker-dealers, the Crypto Adapter gathers the wallet data from crypto ledgers.

To determine the balance of the customer and/or customer committed wallets, distributed ledgers are searched using the key pairs for the customer portfolio and/or customer committed wallets, respectively (920, 922). Once the balance is determined (924), the Crypto Adapter then provides the balance, including digital funds and digital assets, of both the customer portfolio wallet, which includes any settled balances, and the customer committed wallet to the user interface of the broker-dealer (926). The broker-dealer can display the balances associated with the customer portfolio wallet and/or the customer committed wallet (928) and may then receive a buy or sell order from the customer (930). The broker-dealer can determine whether the order is a buy order (930, 932) or a sell order (930, 934).

Processing a Buy Order

Figure 10:
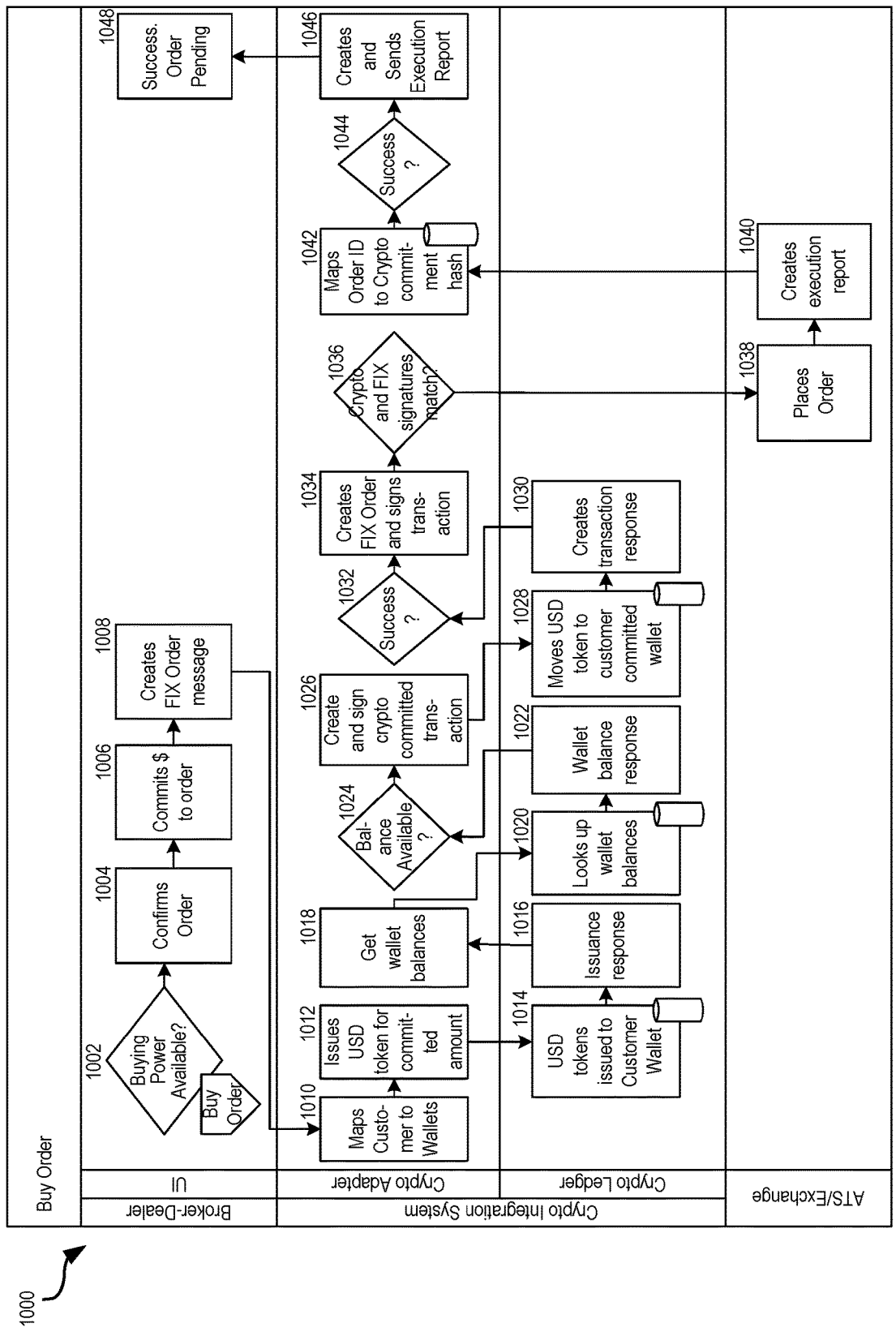
FIG. 10 illustrates a process of receiving and processing an order to purchase digital transactional items.

FIG. 10 illustrates a process 1000 of receiving and processing an order to purchase digital assets, liabilities, or other digital transactional items. The broker-dealer receives a buy order (1002) and determines based on the balance of the customer portfolio wallet, whether the customer has the buying power to make the purchase. Assuming the customer has the buying power to make the purchase; the broker-dealer confirms the order with the customer (1004) and places a hold on the cash or cash-equivalent that the broker-dealer has on deposit for the customer (1006). Next, the broker-dealer creates an order message using legacy trading protocols for pre-trade communications and trade execution, such as a FIX order message or equivalent order message (1008). For purposes of this example, a FIX order message will be used.

When the Crypto Adapter receives the FIX order message, the Crypto Adapter maps the customer identifier to both the customer portfolio wallet and the customer committed wallet (1010). Next, the Crypto Adapter creates a digital representation of the funds such as a USD token, which represents that cash from the customer is being held at the broker-dealer specifically to settle the trade (i.e., a digital liability or IOU from the broker-dealer generally in the amount of the quantity multiplied by the price of the asset) (1012). The Crypto Adapter issues the token to the customer portfolio wallet on behalf of the broker-dealer, which is recorded to the distributed ledger (1014, 1016).

Thereafter, the Crypto Adapter retrieves the customer portfolio wallet balance, which now includes the USD token, and the customer committed wallet balance from the crypto ledger (1018). The crypto ledger looks up the balances and provides the balances to the Crypto Adapter (1020, 1022). The Crypto Adapter determines whether the balance for the order is available (1024). If the balance is available, the Crypto Adapter creates and signs a crypto commitment transaction with the customer's private key for the customer portfolio wallet to transfer the USD token in the customer committed wallet (1026). The crypto committed transaction includes information such as a record of which address was used to send the USD token to the customer portfolio wallet, the amount of the USD token, and the address of the customer committed wallet. After receiving the signed crypto committed transaction and verifying it, the crypto ledger moves the USD token into the customer committed wallet by recording the transaction (1028) and the recordation is provided to the Crypto Adapter (1030). The USD token remains in the committed wallet pending either the settlement or cancellation of the transaction.

Once the USD token is moved from the customer portfolio wallet to the customer committed wallet (1032), the Crypto Adapter creates a FIX order transaction (which will eventually be sent to the ATS) and signs the FIX order transaction using the private key for the customer portfolio wallet (1034). The Crypto Adapter compares the signature from the crypto committed transaction with the signature from the FIX order transaction and determines whether the signatures match (1036). The Crypto Adapter may use asymmetric public key cryptography to determine whether the signatures match.

By verifying that the FIX order transaction was signed by the same party who signed the crypto committed transaction, the Crypto Integration Platform can provide certainty that the FIX order transaction is associated with the crypto committed transaction and therefore that the digital funds are available for the transaction. Additionally, the committed order is public information, so the public can see that the order has a committed balance.

If the signature from the committed transaction matches the signature from the FIX order transaction, the ATS and/or the cryptographic exchange places the order (1038) and creates an execution report (1040), which includes an order identifier. The Crypto Adapter maps the order identifier to the crypto committed transaction hash (1042). Next, assuming the order is placed successfully (1044), the Crypto Adapter creates an execution report indicating that the order is pending and issues the execution report to the broker-dealer (1046). The broker-deal can update its system to reflect that the order is successfully pending (1048). As illustrated, the Crypto Integration Platform allows a broker-dealer to trade on a cryptographic exchange simply by sending a FIX order message.

Processing a Sell Order

Figure 11:
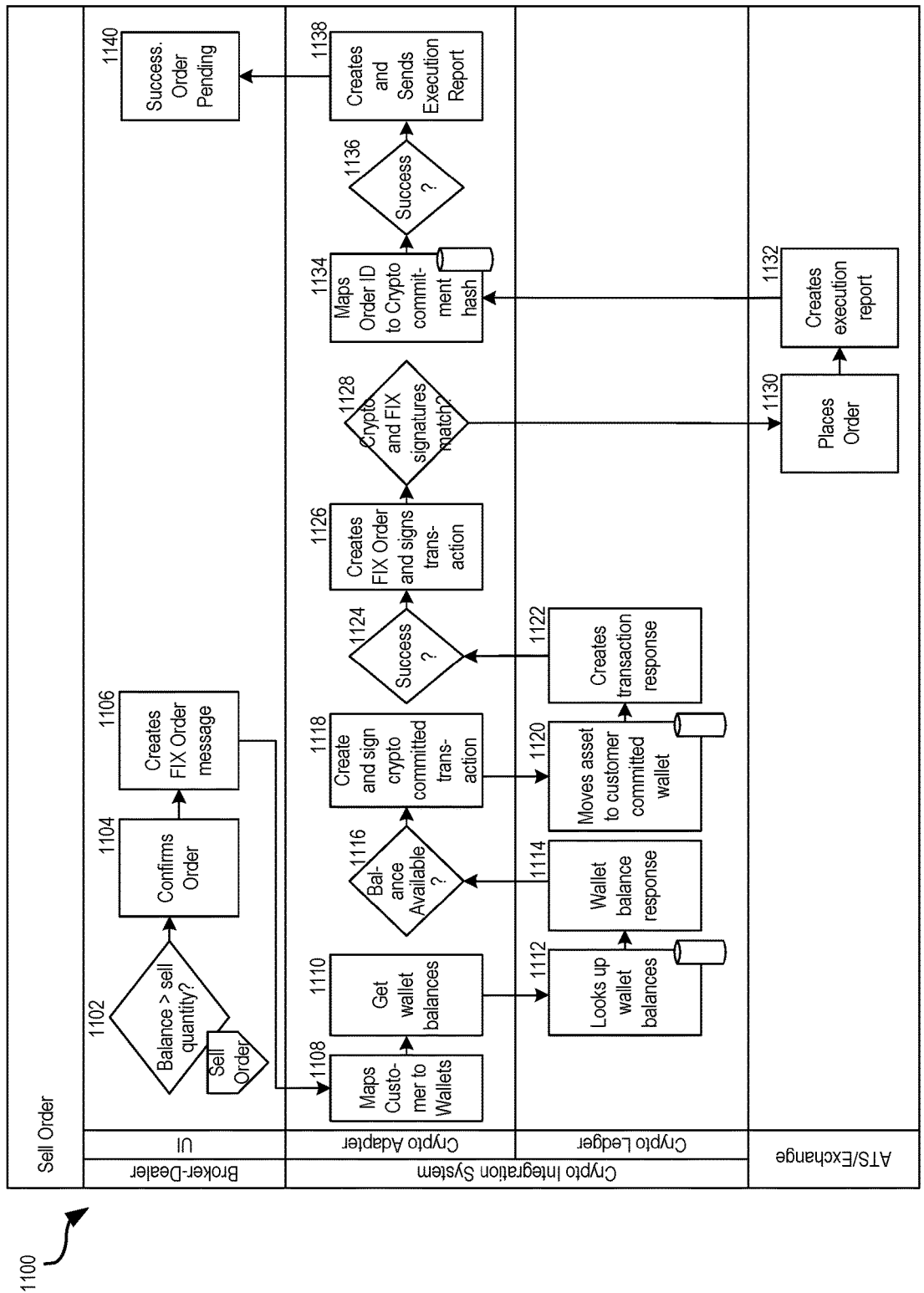
FIG. 11 illustrates a process of receiving and processing an order to sell digital transactional items.

FIG. 11 illustrates a process 1100 of receiving and processing an order to sell digital assets, digital liabilities, or other digital transactional items on a cryptographic exchange. The process for the order to sell is similar to the process for the order to purchase assets, with one exception: there is no need to create a digital liability because the asset is backed by a corporate network.

The broker-dealer receives a sell order (1102) and determines based on the balance of the customer portfolio wallet provided by the Crypto Adapter whether the customer owns the asset to sell. Assuming the customer owns the asset to sell, the broker-dealer confirms the order with the customer (1104). Next, the broker-dealer creates a FIX order message or equivalent order message for pre-trade communications and trade execution (1106). For purposes of this example, a FIX order message will be used.

When the Crypto Adapter receives the FIX order message, the Crypto Adapter maps the customer identifier to the customer portfolio wallet and the customer committed wallet (1108). Next, the Crypto Adapter gathers the customer portfolio wallet balance and the customer committed wallet balance from the crypto ledger (1110, 1112, 1114). Assuming the digital assets or liabilities for sale are associated with the customer portfolio wallet (1116), the Crypto Adapter creates a crypto committed transaction and signs the crypto committed transaction using the private key for the customer portfolio wallet (1118). The crypto committed transaction may include a record of which address was used to send the digital assets to the customer portfolio wallet, an amount of the assets being committed to the trade, and the address of the customer committed wallet. After the signed crypto committed transaction is received and verified, the crypto ledger moves the asset into the customer committed wallet (1120) and creates a transaction response (1122). The asset remains in the customer committed wallet pending either the settlement or cancellation of the transaction.

Once the asset is moved from the customer portfolio wallet to the customer committed wallet successfully (1124), the Crypto Adapter creates a FIX order transaction and signs the FIX order transaction using the private key for the customer committed wallet (1126). The Crypto Adapter compares the signature from the committed transaction with the signature from the FIX order transaction and determines whether the signatures match (1128). As discussed above, asymmetric public key cryptography can be used to ensure that the signatures match.

By verifying that the FIX order transaction was signed by the same party as the crypto committed transaction, the Crypto Integration Platform can provide certainty that the FIX order transaction is associated with the committed transaction and therefore that the asset is available for the transaction.

If the signature from the committed transaction matches the signature from the FIX order transaction, the cryptographic exchange places the order (1130) and creates an execution report (1132), which includes an order identifier. The Crypto Adapter maps the order identifier to the crypto commitment transaction hash (1134). Next, assuming success (1136), the Crypto Adapter creates an execution report indicating that the order is pending and issues the execution report to the broker-dealer (1138). The broker-dealer can update its system to indicate that the order is successfully pending (1140).

Processing a Cancel Order

Figure 12:
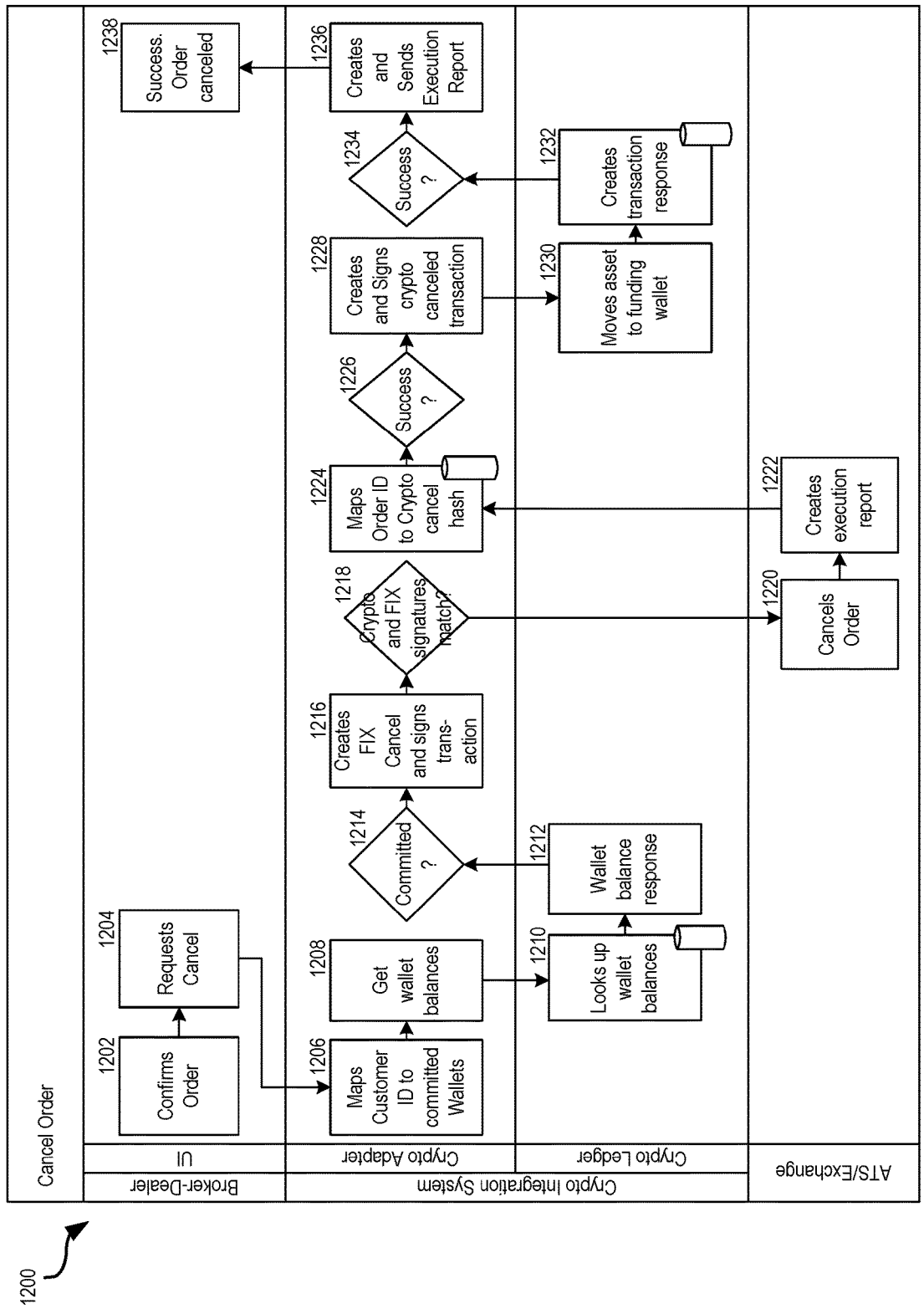
FIG. 12 illustrates a process of cancelling a transaction to sell or purchase digital transactional items.

FIG. 12 illustrates a process 1200 of cancelling a transaction to sell or purchase digital transactional items. If the order to cancel is successful, the digital transactional items (e.g., assets or digital funds) in a customer committed wallet pending a sale or purchase are moved back to the customer portfolio wallet If the digital transactional items have not yet been moved to the customer committed wallet, the cancel order ensures that the digital transactional items will not be moved to the customer committed wallet. The Crypto Integration Platform allows for cancellation of an order by showing that the cancellation is being ordered by the same entity that signed the original FIX transaction.

The broker-dealer receives a request to cancel an order (1202) and sends the request, including the customer identifier, to the Crypto Adapter (1204). When the Crypto Adapter receives the request to cancel the order, the Crypto Adapter maps the customer identifier to the customer portfolio wallet and the customer committed wallet (1206). Next, the Crypto Adapter checks the customer portfolio wallet balance and the customer committed wallet balance by querying the crypto ledger (1208, 1210). The crypto ledger looks up the customer's wallet balances (1210) and provides a response to the Crypto Adapter (1212).

Then, the Crypto Adapter determines whether the contents of the cancel order are in the customer committed wallet (i.e., the assets to be sold or the digital currency to be used for a purchase) (1214). If the contents of the cancel order are not in the customer committed wallet (i.e., the order has already been part of a settlement process), the cancel order is not carried out. If the contents of the cancel order are in the customer committed wallet, the Crypto Adapter creates a FIX cancel transaction and signs the FIX cancel transaction with the private key used to sign the original order that transferred the digital funds or assets into the customer committed wallet (i.e., the private key for the customer portfolio wallet) (1216). The original order is identified by the order identifier that is returned by the crypto matching component and/or the crypto order transaction.

Next, the Crypto Adapter compares the signature from the crypto committed transaction associated with the order with the signature from the FIX cancel transaction and determines whether the signatures match (1218). If the signature from the crypto cancel transaction matches the signature from the FIX cancel transaction, the cryptographic exchange cancels the order and creates an execution report, which includes an order identifier (1220). The cryptographic exchange creates an execution report 1222 for the Crypto Adapter. The Crypto Adapter maps the order identifier to the crypto cancel transaction hash (1224). Next, assuming a successful cancel of the order on the cryptographic exchange (1226), the Crypto Adapter creates and signs a crypto cancel transaction with the private key used to sign the cancel order and the order that transferred the digital funds or assets into the customer committed wallet (i.e., the private key for the customer committed wallet) (1228). The crypto ledger moves the digital funds or asset from the customer committed wallet into the customer portfolio wallet (1230) and creates a transaction response (1232). Assuming success (1234), the Crypto Adapter then creates an execution report indicating that the order is cancelled and issues the execution report to the broker-dealer (1236). The broker-dealer then updates its system with the success cancellation of the order (1238).

Matching Orders

Figure 13:
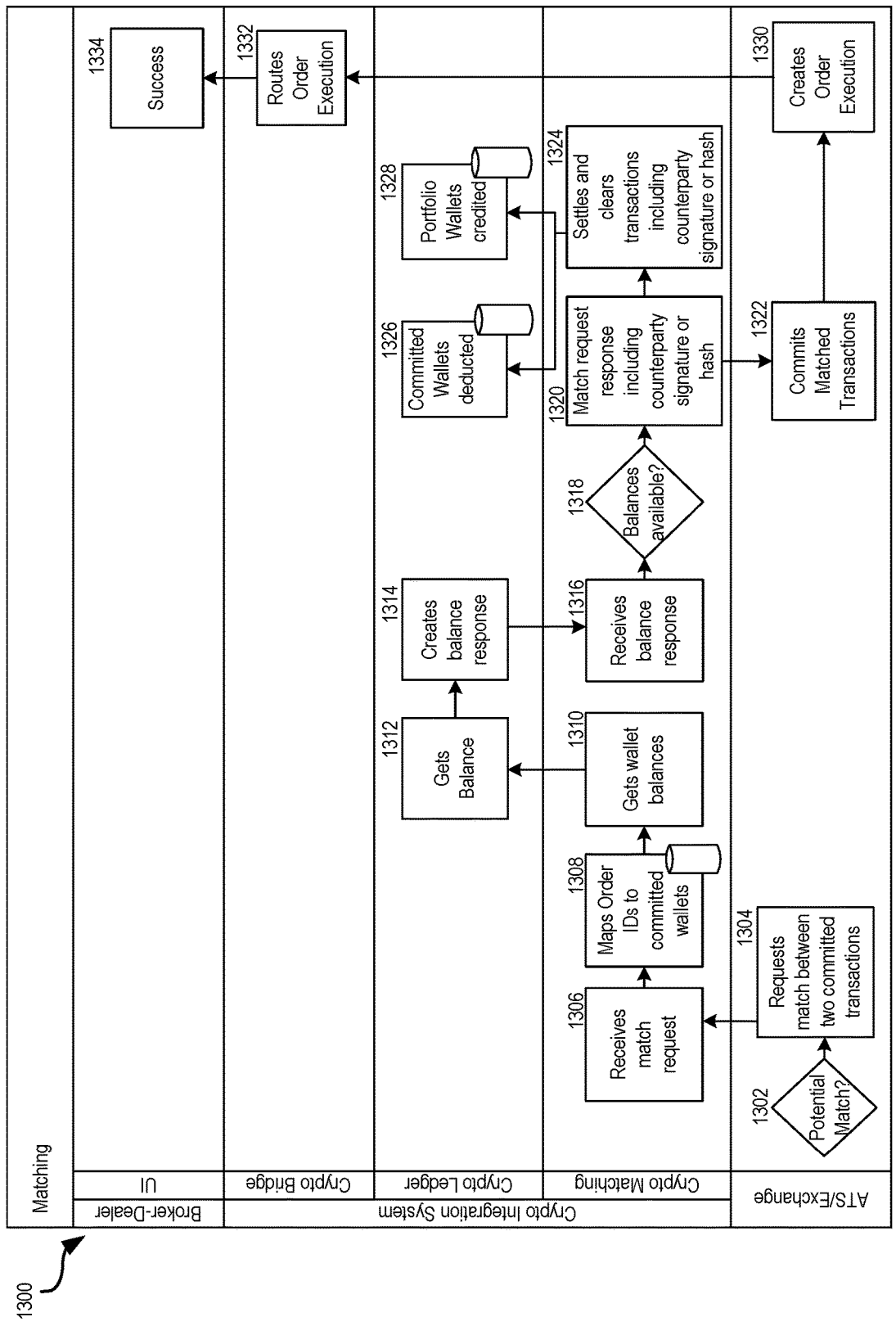
FIG. 13 illustrates a process of settling and clearing transactions for the purchase or sale of digital transactional items.

FIG. 13 illustrates a process 1300 of settling and clearing transactions for the purchase or sale of digital assets. The ATS identifies a potential match between a committed buy order and a committed sell order (1302) and sends a match request to the Crypto Matching Component to verify that the potential match is truly a match (i.e., that the wallet balances associated with each order identifiers are available) (1304).

The Crypto Matching Component receives the match request (1306), maps the order identifiers to the respective committed wallets (1308), and queries the crypto ledger for the customer committed wallet balances associated with both the buy order and the sell order (1310). The Crypto Ledger retrieves the balances (1312), creates a balance response (1314), and provides the balance response to the Crypto Matching Component (1316). The Crypto Matching Component verifies that the balances are available (1318). Assuming the corresponding buy and sell balances are present in the customer committed wallets; the Crypto Matching Component creates a match request to match the orders (1320). The match request includes the signature for the counterparty's customer portfolio wallet and/or counterparty hash for each order which identifies the original order and is publicly distributed on the ledger (1320). For example, the hash for the sell order is the identifier created when moving the asset from the customer portfolio wallet into the customer committed wallet. Similarly, the hash for the buy order is the identifier created during the transaction that moved the USD token into a committed state.

Once the cryptographic exchange receives the match request response indicating a match, the cryptographic exchange matches the transaction, commits the matched transaction (1322) by recording the exchange of assets/funds to the respective counterparty's customer portfolio wallets and creates the order execution (1330), which is routed to the Crypto Bridge and communicated to the broker dealer. Simultaneously or nearly simultaneously, the Crypto Matching Component settles and clears transactions using the counterparty hash (1324). The settlement and clearing of the transactions includes deducting the digital funds or assets from the purchasing or selling customer's committed wallet, respectively (1326), and crediting the purchasing and selling customer portfolio wallets with assets and digital funds, respectively (1328). The cryptographic exchange routes the order execution to the Crypto Bridge (1332), which routes the results of successful transaction to the broker-dealer (1334).

Various embodiments of the present disclosure are described below.

1. A computerized method comprising:
   creating, by a computer, a first addressed account and a second addressed account, each having a common identifier and each associated with a first customer;
   receiving, from a remote computing device, an order for exchanging one or more digital transactional items associated with the first addressed account, wherein the order is associated with the common identifier;
   electronically signing, with a private key associated with the first addressed account, a first transaction to transfer the one or more digital transactional items from the first addressed account to the second addressed account;
   electronically signing, with the private key associated with the first addressed account, a second transaction;
   verifying that the first transaction was signed with the same private key as the second transaction; and
   authorizing placement of the order on a cryptographic exchange upon verifying that the first transaction was signed with the same private key as the second transaction.

2. The computerized method of claim 1, wherein the second addressed account is associated with a second key pair which includes a second public key and a second private key.

3. The computerized method of claim 1, further comprising:
   receiving confirmation, from a distributed ledger, that the one or more digital transactional items associated with the order are associated with the first addressed account by using the first public key; and upon receiving the confirmation that the one or more digital transactional items associated with the order are associated with the first addressed account, creating the first transaction and the second transaction.

4. The computerized method of claim 1, further comprising communicating, to a distributed ledger, a balance of the first addressed account and the second addressed account.

5. The computerized method of claim 1, wherein the order is an order to purchase a digital asset or a digital liability, the computerized method further comprising:

receiving, from the remote computing device, information indicating that funds are available to purchase the digital asset or the digital liability, wherein the one or more digital transactional items is a digital representation of the funds; and associating the digital representation of the funds with the first addressed account as the one or more digital transactional items.

6. The computerized method of claim 1, wherein the order is an order to sell the one or more digital transactional items, wherein the one or more digital transactional items is one or more digital assets or one or more digital liabilities, the computerized method further comprising:

receiving, from the remote computing device, information indicating that assets corresponding to the one or more digital assets or liabilities corresponding to the one or more digital liabilities are available to sell.

7. The computerized method of claim 1, further comprising creating a third addressed account, wherein the third digital addressed account includes a first key pair associated with the first addressed account and a second key pair associated with the second addressed account.

8. The computerized method of claim 1, further comprising:

creating the first transaction, wherein the first transaction includes at least one of:
the one or more digital transactional items, the identifier, and a public key of the second addressed account;
creating a hash of the first transaction; and
creating the second transaction, wherein the second transaction includes at least one of: a type of the order, the identifier, a public key of the second addressed account, and the hash of the first transaction.

9. The computerized method of claim 1, further comprising sending the first transaction to the cryptographic exchange; and sending the second transaction to an alternative trading system.

10. The computerized method of claim 9, further comprising:

receiving a notification that the order has been matched to a second order on the cryptographic exchange; and
creating an execution report.

11. The computerized method of claim 1, wherein the first addressed account is a customer portfolio account, wherein the second addressed account is a customer committed account.

12. The computerized method of claim 1, wherein the first transaction includes at least one of: funds in an amount corresponding to a value of the first transaction or a representation of the funds in the amount corresponding to the value of the first transaction and a public key of the first addressed account, and wherein the second transaction includes at least one of: a public key of the second addressed account, a type of the order, the identifier, a public key of the second addressed account, and a hash of the first transaction.

13. A computerized method comprising receiving, from a broker-dealer, a request to match a buy transaction with a sell transaction,
wherein the buy transaction includes a buy order to purchase one or more digital transactional items for an amount corresponding to a value of the one or more digital transactional items and the sell transaction includes a sell order to sell the one or more digital transactional items for the amount,
wherein the buy transaction has an associated first signature that corresponds to a first addressed account that identifies the buy order, wherein the sell transaction has an associated second signature corresponding to a second addressed account that identifies the sell order, the first addressed account being associated with a first customer and the second addressed account being associated with a second customer,
wherein the amount is associated with a third addressed account associated with the first customer and the one or more digital transactional items are associated with a fourth addressed account associated with the second customer;
mapping, by a computer, the buy transaction to the third addressed account and the sell transaction to the fourth addressed account;
sending, to the cryptographic exchange, a match request response including the first signature and the second signature to commit the buy transaction; and
transferring the one or more digital transactional items to the first addressed account and transferring the amount to the second addressed account to settle and clear the buy transaction and the sell transaction.

14. The method of claim 13, further comprising
receiving confirmation, from a distributed ledger, that the amount is associated with the third addressed account and that the one or more digital transactional items are associated with the fourth addressed account prior to sending the match request response.

15. The computerized method of claim 13, wherein the one or more digital transactional items include one or more of digital assets or digital liabilities, wherein the amount includes an amount of currency, cryptographic currency, or a representation of the currency or the cryptographic currency corresponding to a value of the one or more digital transactional items.

16. The computerized method of claim 13, further comprising publishing, to a remote computing device, results of settling and clearing the buy transaction and the sell transaction.

17. The computerized method of claim 13, wherein the first signature is a private key associated with the first addressed account, wherein the second signature is a private key associated with the second addressed account.

18. The computerized method of claim 13, wherein:

the first addressed account is a customer portfolio account associated with the first customer, the second addressed account is a customer portfolio account associated with the second customer, the third addressed account is a customer committed account associated with the first customer, and the fourth addressed account is a customer committed account associated with the second customer.

19. A cryptographic integration system, comprising:
at least one processor; and
at least one computer readable storage medium having instructions stored thereon, which when executed by the at least one processor causes the cryptographic integration system to:
receive an order to execute a trade for one or more digital transactional items associated with a first addressed account, wherein the order, the first addressed account, and a second addressed account are associated with an identifier;
generate a first transaction to transfer the one or more digital transactional items from the first addressed account to the second addressed account;
generate a second transaction that includes the order,
verify that the first transaction was authorized by a same party as the second transaction; and
authorize placement of the order on a cryptographic exchange after verifying that the first transaction was authorized by the same party as the second transaction.

20. The cryptographic integration system of claim 19, wherein the first transaction is authorized by the same party as the second transaction when the first transaction and the second transaction are signed by a same key.

21. The cryptographic integration systems of claim 20, wherein the key is a private key of the first addressed account, and wherein the second transaction includes a hash of the first transaction.

22. The cryptographic integration system of claim 19, wherein the instructions, which when executed by the at least one processor further cause the cryptographic integration system to:
receive, from the cryptographic exchange, a request to match the order with a second order, wherein the second order is associated with a second identifier; and
transfer the one or more digital transactional items to an addressed account associated with the second identifier and transfer one or more other digital transactional items into the first addressed account to settle and clear the order.

23. The cryptographic integration system of claim 19, further comprising a cryptographic adapter component adapted for:
sending the first transaction to the cryptographic exchange; and
sending the second transaction to an alternative trading system.

24. A non-transitory computer-readable storage medium including a set of instructions that, when executed by one or more processors, cause a machine to:
create a first addressed account and a second addressed account, each having a common identifier and each associated with a first customer;
receive an order for exchanging one or more digital transactional items associated with the first addressed account, wherein the order is associated with the common identifier;
electronically sign, with a private key associated with the first addressed account, a first transaction to transfer the one or more digital transactional items from the first addressed account to the second addressed account;
electronically sign, with the private key associated with the first addressed account, a second transaction;
verify that the first transaction was signed with the same private key as the second transaction; and
authorize placement of the order on a cryptographic exchange upon verifying that the first transaction was signed with the same private key as the second transaction.

25. A non-transitory computer-readable storage medium including a set of instructions that, when executed by one or more processors, cause a machine to:
receive, from a broker-dealer, a request to match a buy transaction with a sell transaction,
wherein the buy transaction includes a buy order to purchase one or more digital transactional items for an amount corresponding to a value of the one or more digital transactional items and the sell transaction includes a sell order to sell the one or more digital transactional items for the amount,
wherein the buy transaction has an associated first signature that corresponds to a first addressed account that identifies the buy order, wherein the sell transaction has an associated second signature corresponding to a second addressed account that identifies the sell order, the first addressed account being associated with a first customer and the second addressed account being associated with a second customer,
wherein the amount is associated with a third addressed account associated with the first customer and the one or more digital transactional items are associated with a fourth addressed account associated with the second customer;
map the buy transaction to the third addressed account and the sell transaction to a fourth addressed account;
send, to the cryptographic exchange, a match request response including the first signature and the second signature to commit the buy transaction; and
transfer the one or more digital items to the first addressed account and transferring the amount to the second addressed account to settle and clear the buy transaction and the sell transaction.

Computer System Overview

Figure 14:
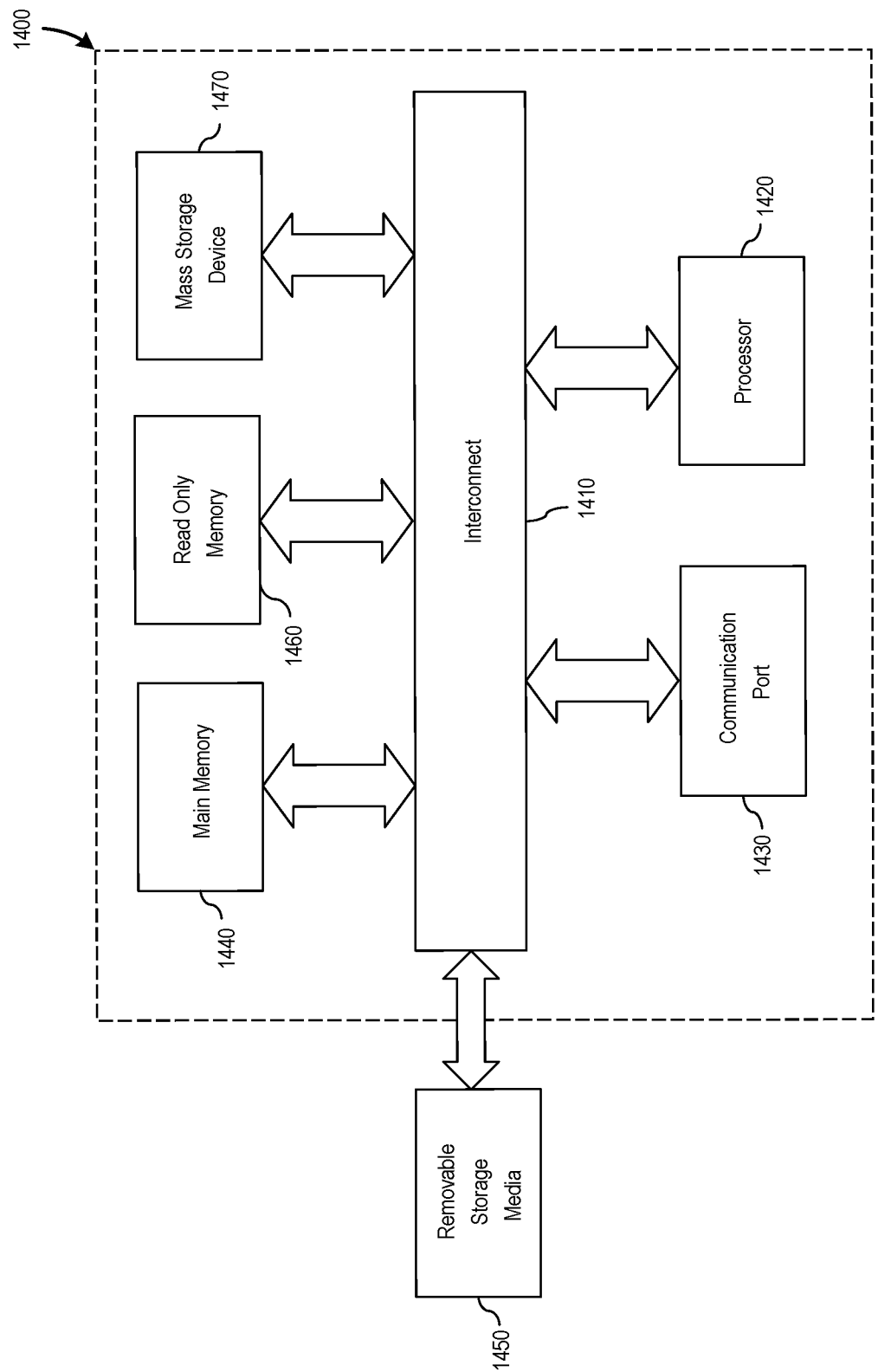
FIG. 14 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 14 is an example of a computer system 1400 with which embodiments of the present disclosure may be utilized. According to the present example, the computer system 1400 includes an interconnect 1410, at least one processor 1420, at least one communication port 1430, a main memory 1440, a removable storage media 1450, a read only memory 1460, and a mass storage device 1470.

Processor(s) 1420 can be any known processor. Communication port(s) 1430 can be or include, for example, any of an RS-232 port for use with a modem-based dialup connection, a 10/100 Ethernet port, or a Gigabit port using copper or fiber. The nature of communication port(s) 1430 may be chosen depending on a network such as Local Area Network (LAN), Wide Area Network (WAN), or any network to which the computer system 1400 connects.

Main memory 1440 can be Random Access Memory (RAM), or any other dynamic storage device(s) commonly known in the art. Read only memory 1460 can be any static storage device(s) such as Programmable Read Only Memory (PROM) chips for storing static information such as instructions for processor 1420.

Mass storage device 1470 can be used to store information and instructions. For example, hard disks such as the Adaptec® family of SCSI drives, an optical disc, an array of disks such as RAID, such as the Adaptec family of RAID drives, or any other mass storage devices may be used.

Interconnect 1410 can be or include one or more buses, bridges, controllers, adapters, and/or point-to-point connections. Interconnect 1410 communicatively couples processor(s) 1420 with the other memory, storage, and communication blocks. Interconnect 1410 can be a PCI/PCI-X or SCSI based system bus depending on the storage devices used.

Removable storage media 1450 can be any kind of external hard-drives, floppy drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for trading digital transactional items. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations that fall within the scope of the claims, together with all equivalents thereof. Therefore, the above description should not be taken as limiting.

What is claimed is:

1. A cryptographic integration system, comprising:
   at least one processor; and
   at least one memory communicatively coupled to the at least one processor;
   wherein the at least one processor is configured to:
      receive a request to match a buy transaction with a sell transaction,
         wherein the buy transaction includes a buy order to purchase one or more digital transactional items for an amount corresponding to a value of the one or more digital transactional items and the sell transaction includes a sell order to sell the one or more digital transactional items for the amount,
         wherein the buy transaction has a first signature of a first private key corresponding with a first account that identifies the buy order, wherein the sell transaction has a second signature of a second private key corresponding with a second account that identifies the sell order, the first account being associated with a first customer and the second account being associated with a second customer, wherein the amount is associated with a third account associated with the first customer, wherein the amount associated with the third account is committed for use in the buy order, and wherein the one or more digital transactional items are associated with a fourth account associated with the second customer, wherein the one or more digital transactional items associated with the fourth account are committed for use in the sell order;

map the buy transaction to the third account and the sell transaction to the fourth account;

send, to a cryptographic exchange, a match request response including the first signature and the second signature to commit the buy transaction; and transfer the one or more digital transactional items from the fourth account associated with the second customer to the first account associated with the first customer and transferring the amount from the third account associated with the first customer to the second account associated with the second customer to settle and clear the buy transaction and the sell transaction.

2. The cryptographic integration system of claim 1, wherein the at least one processor is further configured to:
receive confirmation, from a distributed ledger, that the amount is associated with the third account and that the one or more digital transactional items are associated with the fourth account prior to sending the match request response.

3. The cryptographic integration system of claim 1, wherein the one or more digital transactional items include one or more of digital assets or digital liabilities, wherein the amount includes an amount of currency, cryptographic currency, or a representation of the currency or the cryptographic currency corresponding to a value of the one or more digital transactional items.

4. The cryptographic integration system of claim 1, wherein the at least one processor is further configured to:
publish, to a remote computing device, results of settling and clearing the buy transaction and the sell transaction.

5. The cryptographic integration system of claim 1, wherein:
the first account is a first customer portfolio account associated with the first customer,
the second account is a second customer portfolio account associated with the second customer,
the third account is a first customer committed account associated with the first customer, and
the fourth account is a second customer committed account associated with the second customer.

6. The cryptographic integration system of claim 1, wherein the one or more digital transaction items include tokenized assets.

7. The cryptographic integration system of claim 1, wherein the one or more digital transactional items are selected from at least one of: tokens, cash, cash equivalents, crypto currencies, digitized dollars, digital assets, digital liabilities, digital shares of stocks, securities, and digital funds.

8. A computerized method comprising
receiving, from a broker-dealer, a request to match a buy transaction with a sell transaction,
wherein the buy transaction includes a buy order to purchase one or more digital transactional items for an amount corresponding to a value of the one or more digital transactional items and the sell transaction includes a sell order to sell the one or more digital transactional items for the amount, wherein the buy transaction has a first signature of a first private key corresponding with a first account that identifies the buy order, wherein the sell transaction has a second signature of a second private key corresponding with a second account that identifies the sell order, the first account being associated with a first customer and the second account being associated with a second customer, wherein the amount is associated with a third account associated with the first customer, wherein the amount associated with the third account is committed for use in the buy order, and wherein the one or more digital transactional items are associated with a fourth account associated with the second customer, wherein the one or more digital transactional items associated with the fourth account are committed for use in the sell order;

mapping, by a computer, the buy transaction to the third account and the sell transaction to the fourth account;

sending, to the cryptographic exchange, a match request response including the first signature and the second signature to commit the buy transaction; and transferring the one or more digital transactional items from the fourth account associated with the second customer to the first account associated with the first customer and transferring the amount from the third account associated with the first customer to the second account associated with the second customer to settle and clear the buy transaction and the sell transaction.

9. The computerized method of claim 8, further comprising:
receiving confirmation, from a distributed ledger, that the amount is associated with the third account and that the one or more digital transactional items are associated with the fourth account prior to sending the match request response.

10. The computerized method of claim 8, wherein the one or more digital transactional items include one or more of digital assets or digital liabilities, wherein the amount includes an amount of currency, cryptographic currency, or a representation of the currency or the cryptographic currency corresponding to a value of the one or more digital transactional items.

11. The computerized method of claim 8, further comprising:
publishing, to a remote computing device, results of settling and clearing the buy transaction and the sell transaction.

12. The computerized method of claim 8, wherein:
the first account is a first customer portfolio account associated with the first customer,
the second account is a second customer portfolio account associated with the second customer,
the third account is a first customer committed account associated with the first customer, and
the fourth account is a second customer committed account associated with the second customer.

13. The computerized method of claim 8, wherein the one or more digital transaction items include tokenized assets.

14. The computerized method of claim 8, wherein the one or more digital transactional items are selected from at least one of: tokens, cash, cash equivalents, crypto currencies, digitized dollars, digital assets, digital liabilities, digital shares of stocks, securities, and digital funds.

15. A non-transitory computer-readable storage medium including a set of instructions that, when executed by one or more processors, cause a machine to:

receive, from a broker-dealer, a request to match a buy transaction with a sell transaction,
wherein the buy transaction includes a buy order to purchase one or more digital transactional items for an amount corresponding to a value of the one or more digital transactional items and the sell transaction includes a sell order to sell the one or more digital transactional items for the amount,
wherein the buy transaction has a first signature of a first private key corresponding with a first account that identifies the buy order, wherein the sell transaction has a second signature of a second private key corresponding with a second account that identifies the sell order, the first account being associated with a first customer and the second account being associated with a second customer,
wherein the amount is associated with a third account associated with the first customer, wherein the amount associated with the third account is committed for use in the buy order, and
wherein the one or more digital transactional items are associated with a fourth account associated with the second customer, wherein the one or more digital transactional items associated with the fourth account are committed for use in the sell order;

map the buy transaction to the third account and the sell transaction to a fourth account;

send, to the cryptographic exchange, a match request response including the first signature and the second signature to commit the buy transaction; and transfer the one or more digital items from the fourth account associated with the second customer to the first account associated with the first customer and transfer the amount from the third account associated with the first customer to the second account associated with the second customer to settle and clear the buy transaction and the sell transaction.

16. The non-transitory computer-readable storage medium of claim 15, wherein the set of instructions, when executed by one or more processors, cause the machine to:
receive confirmation, from a distributed ledger, that the amount is associated with the third account and that the one or more digital transactional items are associated with the fourth account prior to sending the match request response.

17. The non-transitory computer-readable storage medium of claim 15, wherein the one or more digital transactional items include one or more of digital assets or digital liabilities, wherein the amount includes an amount of currency, cryptographic currency, or a representation of the currency or the cryptographic currency corresponding to a value of the one or more digital transactional items.

18. The non-transitory computer-readable storage medium of claim 15, wherein:
the first account is a first customer portfolio account associated with the first customer,
the second account is a second customer portfolio account associated with the second customer,
the third account is a first customer committed account associated with the first customer, and
the fourth account is a second customer committed account associated with the second customer.

19. The non-transitory computer-readable storage medium of claim 15, wherein the one or more digital transaction items include tokenized assets.

20. The non-transitory computer-readable storage medium of claim 15, wherein the one or more digital transactional items are selected from at least one of: tokens, cash, cash equivalents, crypto currencies, digitized dollars, digital assets, digital liabilities, digital shares of stocks, securities, and digital funds.

\* \* \* \* \*